US012474252B2

(12) United States Patent
Dozortsev et al.

(10) Patent No.: US 12,474,252 B2
(45) Date of Patent: Nov. 18, 2025

(54) TECHNIQUES FOR FORECASTING AND/OR PREVENTING DEGRADATION AND CORROSION

(71) Applicant: AMS Trace Metals, Inc., Sunnyvale, CA (US)

(72) Inventors: Vladimir Dozortsev, Ridgewood, NJ (US); Richard Bacon, Fremont, CA (US)

(73) Assignee: AMS Trace Metals, Inc., Wilmington, DE (US)

( * ) Notice: Subject to any disclaimer, the term of this patent is extended or adjusted under 35 U.S.C. 154(b) by 141 days.

(21) Appl. No.: 18/264,175

(22) PCT Filed: Mar. 9, 2022

(86) PCT No.: PCT/US2022/019622
§ 371 (c)(1),
(2) Date: Aug. 3, 2023

(87) PCT Pub. No.: WO2022/192451
PCT Pub. Date: Sep. 15, 2022

(65) Prior Publication Data
US 2024/0133797 A1    Apr. 25, 2024
US 2024/0230514 A9    Jul. 11, 2024

Related U.S. Application Data

(60) Provisional application No. 63/159,871, filed on Mar. 11, 2021.

(51) Int. Cl.
*G01N 17/02* (2006.01)
*C25D 9/06* (2006.01)
(Continued)

(52) U.S. Cl.
CPC .......... *G01N 17/02* (2013.01); *C25D 17/10* (2013.01); *C25D 17/12* (2013.01); *C25D 21/14* (2013.01); *C25D 9/06* (2013.01); *C25D 21/18* (2013.01)

(58) Field of Classification Search
CPC .......... G01N 17/02; C25D 9/06; C25D 17/10; C25D 17/12; C25D 21/14; C25D 21/18
(Continued)

(56) References Cited

U.S. PATENT DOCUMENTS 4,941,953 A   7/1990   Matsumoto
5,685,994 A   11/1997  Johnson
(Continued)

FOREIGN PATENT DOCUMENTS

JP      54-110147 A1       8/1979
WO      WO2010043776 A1    4/2010

OTHER PUBLICATIONS

Written Opinion, Application PCT/US18/40836, 9 pages, mailed Sep. 18, 2018.
(Continued)

*Primary Examiner* — Raul J Rios Russo
(74) *Attorney, Agent, or Firm* — Marc P. Schuyler

(57) ABSTRACT

This disclosure provides techniques for detecting/inhibiting corrosion of in distribution/recirculation service lines and for using tin dioxide as a surfactant to coat at-risk piping surfaces. For example, disclosed techniques can be used to correlate corrosive conditions with fluid type, source and other environmental parameters, and to treat piping so as to insulate corroding areas. A stannous dosing system, and optionally, associated downstream filtration, can be used to efficiently deliver tin throughout piping surfaces at interest, and thereby facility local tin dioxide surfactant buildup to target thicknesses, at difficult to reach locations. In one
(Continued)

embodiment, disclosed systems can be used to build a correlation database that can be used in the automated control of systems taught herein.

18 Claims, 11 Drawing Sheets

(51) Int. Cl.
    *C25D 17/10* (2006.01)
    *C25D 17/12* (2006.01)
    *C25D 21/14* (2006.01)
    *C25D 21/18* (2006.01)

(58) Field of Classification Search
    USPC ........................................................ 324/700
    See application file for complete search history.

(56) References Cited

U.S. PATENT DOCUMENTS

| | | |
|---|---|---|
| 6,175,752 B1 | 1/2001 | Say |
| 11,530,143 B2 | 12/2022 | Dozortsev |
| 2007/0068823 A1* | 3/2007 | Takizawa .................. C25D 3/30 205/300 |
| 2007/0108056 A1 | 5/2007 | Nyberg |
| 2008/0017523 A1 | 1/2008 | Dietze |
| 2012/0138471 A1* | 6/2012 | Mayer .................... C25D 21/12 204/275.1 |
| 2014/0042026 A1 | 2/2014 | Kahn |
| 2015/0010773 A1 | 1/2015 | Sauer |
| 2016/0312373 A1* | 10/2016 | Mayer ....................... C25C 7/00 |
| 2017/0008775 A1 | 1/2017 | Finke |
| 2018/0237933 A1* | 8/2018 | Mayer .................... C25D 21/18 |
| 2020/0207645 A1 | 7/2020 | Dozortsev |

OTHER PUBLICATIONS

ISR, Application PCT/US18/40836, 4 pages, mailed Sep. 18, 2018.
ISO/WO, mailed May 23, 2022, PCT/US22/19622, 11 pages.
Kachoosangi et al., "Voltametric detection of chromium (VI) using a gold film modified carbon composite electrode," 2 pages, Sensors and Actuators B: Chemical, V178, Mar. 1, 2013 (cited by searcher for unknown reasons in PCTUS1840836).

* cited by examiner

TECHNIQUES FOR FORECASTING AND/OR PREVENTING DEGRADATION AND CORROSION

This disclosure is a national stage entry of PCT Patent Application No. PCT/US2022/019622, filed internationally on Mar. 9, 2022, which in turn claims the benefit of U.S. Provisional Patent Application No. 63/159,871, filed on Mar. 11, 2021, on behalf of first-named inventor Vladimir Dozortsev, which is hereby incorporated by reference. This disclosure also incorporates by reference the following documents: US Patent Publication (USPB) 20200207645, filed on behalf of first-named inventor Vladimir Dozortsev for "Treatment of aqueous matrices using electrolysis to produce soluble tin metal" as U.S. patent application Ser. No. 16/622,529, and USPB 20220334048 (U.S. patent application Ser. No. 17/624,900, which is a national stage entry of WO2021055296, filed in the US Receiving Office On Sep. 14, 2020, as International Patent Application No. PCT/US2020/050773, on behalf of first-named inventor Vladimir Dozortsev, for "Techniques for forecasting and/or preventing corrosion and degradation").

FIELD

This disclosure relates to mitigating corrosion of pipes and other elements of a fluidics system, and to related methods and systems.

BACKGROUND

Corrosion of piping, joints, solder and/or other elements of a fluidics system can create substantial problems. Aside from loss of structural integrity, corrosion can change the chemical composition of fluid conveyed by the system, transferring harmful metals into the fluid and engendering the formation of biofilms. A fluidics system as used herein can include a recirculatory system, such as heating or cooling system, as well as systems that provide for one-time distribution of a fluid. In a water distribution system for example, corroded pipe material, such as lead or other metals, can be harmful to human health or the environment.

Compounding these problems, many fluidics systems have components that are not easily accessed and/or replaced. A municipal water supply system for example can have extensive underground piping, or piping that is otherwise not easily reached. An industrial cooling system might be so heavily relied on that it is not practical to perform major system overhauls or take system components offline for any length of time. Changes made in the fluid being carried can also accelerate corrosion; for example, a seasonal switch to a different water source, presence or absence of certain chemicals (e.g., sanitizers), or variation in other environmental parameters associated with the fluidics system such as organics present, metals present, temperature, pH, mineral content, to name a few, can greatly influence the corrosion issue.

Unfortunately, there exists few mitigation strategies beyond component replacement and the use of expensive and/or harmful chemicals. To cite one example of these difficulties, the presence biological agents in piping can accelerate corrosion; certain chemicals (e.g., sanitizers such as bromine or chlorine) can be added to kill these agents, but these added chemicals can themselves also cause corrosion or lead to other detrimental effects (e.g., presence of carcinogens in a water supply).

A definite need therefore exists for better mechanisms to address each of these problems; the techniques provided herein address these needs.

BRIEF DESCRIPTION OF THE DRAWINGS

FIG. 6B represents the optional use of dead reckoned measurements or feedback based measures, to assess need for and/or deliver mitigation measures, and to deliver soluble stannous material on a regulated basis.

Figure 1A:
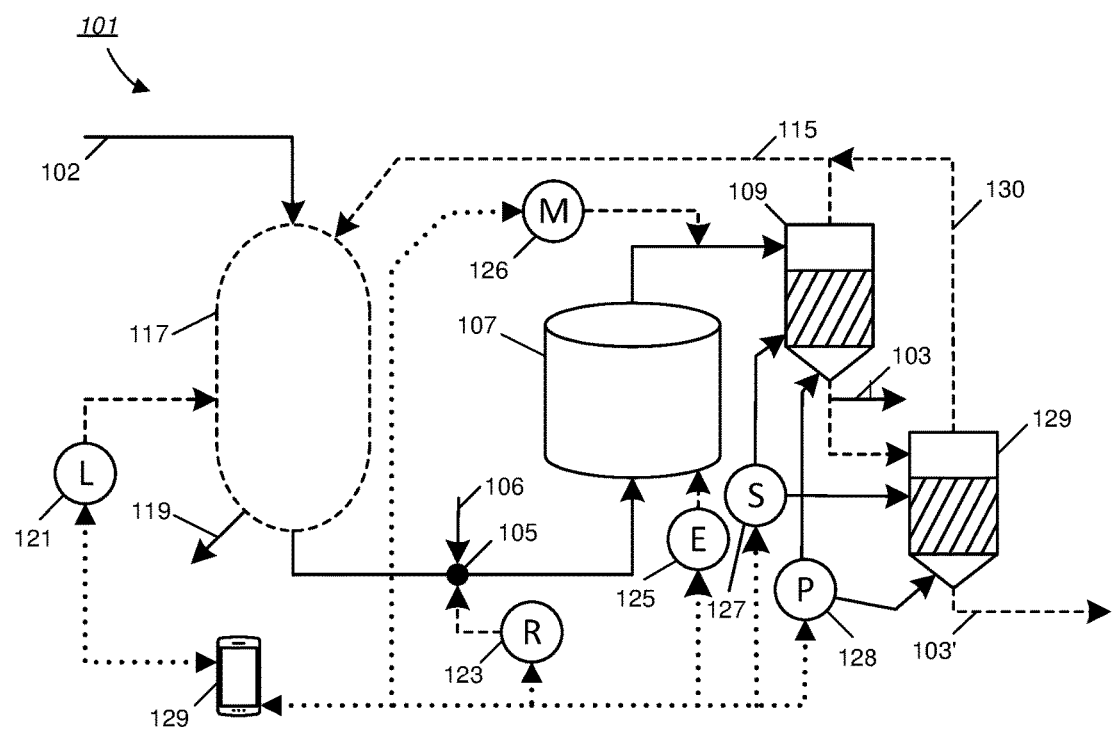
FIG. 1A is a schematic view of one embodiment that adds stannous material to a fluid of interest (typically an aqueous matrix, such as water). In one embodiment, the stannous material can be efficiently and inexpensively generated in situ, in soluble form, using regulated electrolysis. The stannous material is efficiently generated directly in the fluid being conveyed and is readily distributed to a surface of interest for which treatment is desired directly by the transported fluid; the stannous material forms an effective bioagent, and once local to the surface of interest, it engenders in situ formation of insoluble tin dioxide, which adheres to the surface of interest and thereafter provides an insulating material which resists corrosion and protects preexisting pipe protective scaling (if any) against degradation.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of (1) techniques that can be used control/remove the presence of unwanted metals from a fluid, (2) techniques that can be used to assess health of mineral scale on fluid transport surfaces within a fluid network, and/or the propensity of such surfaces to corrode and/or support formation of undesired biofilms, (3) techniques that can be used to efficiently deliver soluble stannous material and/or assess health of a protective film of tin dioxide on transport surfaces, i.e., to retard either corrosion or, if desired, mineral scale degradation, (4) techniques for inexpensively generating tin dioxide, and/or for the use of tin dioxide in flue gas desulfurization, and/or (5) techniques that can be otherwise used to test for and/or control corrosion. Other benefits/applications will become clear from the description provided below. The various techniques can be embodied as software/firmware, in the form of a computer, device, service, cloud service, system, a localized or distributed network of multiple systems, a testing apparatus or measurement device, a database, as one or more treatment methods, or in some other manner. While specific examples are presented, particularly in the context of industrial cooling systems, potable water and wastewater, the principles described herein may also be applied to other systems, applications, methods and devices as well.

DETAILED DESCRIPTION

This disclosure provides techniques for mitigating or avoiding corrosion of piping in a fluidics system, by inexpensively and efficiently generating stannous material in situ (that is, in the liquid), through use of electrolysis of food grade tin electrodes. The stannous material is soluble and is efficiently distributed by the fluid of interest throughout a fluidics system, e.g., through potentially hundreds of meters of piping, and to potentially difficult to reach remote locations. The soluble tin metal provides a bioagent and it combines with oxygen to, over time, form insoluble tin dioxide, which then coats interior pipe surfaces. The tin dioxide can also trap trace metals, e.g., which might be a product of existing corrosion, and the help sequester those metals from the fluid of interest (i.e., thereby providing further benefits). Although relatively soft, a thin tin dioxide layer tends to remain in place in absence of mechanical abrasion and provides a surfactant that protects and insulates pipe surfaces including any desired mineral scale. In some embodiments, stannous generation is regulated so as to add only "just enough" stannous material to retain and/or prevent corrosion, with initial dosing or intermittent dosing applied to generate and maintain a threshold tin dioxide surfactant layer (e.g., 1-10 microns thick), but with electrode control otherwise throttled back so as to preserve electrode lifetime; typically, at least one environmental parameter is measured which affects the rate and propensity for surfactant layer formation, and this measured property is then used to regulate electrode control so as to form the desired layer thickness. This environmental parameter can be any parameter associated with the fluidic system, including a parameter associated with the fluid, a parameter that characterizes any component of the system (e.g., a specific metal pipe section), or an external parameter such as time of day, or year, temperature and so forth. Without limitations, some environmental parameters that can be measured and used as a factor in regulating electrolysis include metal concentration in the liquid, sanitizer concentration, fluid constituency or source type or identity, temperature, time of year, flow rate, pressure, sanitizer type, pipe type, protective scale type, concentration of protective scale materials in the fluid of interest, fluid dwell time measurement, pipe or system age, organics present and type of organics, presence of other specific chemicals, reagent generation efficiency, presence of sanitization by products (e.g., trihalomethane concentration), and a myriad of other factors. Further, in some optional embodiments, sensors can be used to detect electrode befuddlement and/or provide automated cleaning to preserve optimal electrode efficiency and/or detect a need for replacement or maintenance. This is to say, regulation of electrode drive may be performed so as to obtain target film thicknesses and/or otherwise drive detected corrosion to zero or to acceptable limits, using feedback and/or measured parameters. For example, stannous generation can be regulated (e.g., using hysteresis) so as to drive and maintain a layer of tin dioxide having a thickness that meets specified range criteria. These and other advantages will appear from the description below. Preliminarily, it should be noted that the term "pipe" and "piping" are used herein to refer to anything in a fluidics system that comes into contact with fluid being transported, i.e., these terms are not limited to conventionally usage of the term "pipe," and they can encompass without limitation solder, plumbing fixtures, joints, valves, tanks, regulators, heat exchangers, aerators and any other component which comes into contact with the fluid being transported.

Note preliminarily that in some embodiments, tin dioxide is formed on top of existing mineral scale. Conventional wisdom is that mineral scale in piping is undesirable to any extent. It is well-known for example that limescale buildup can constrict fluid flow. Operators of fluidics systems (including by way of nonlimiting example, water supply companies, heating/cooling system operators and others) commonly use processes to route-out any accumulated limescale. However, in many systems, a certain amount of scale, of the right type, can actually be beneficial to overall system health, because such also insulates metal material in the pipe or other fluid contact surface from the fluid being carried; some piping in fact is sold with a native layer of protective scale applied during manufacturing, to help retard corrosion. Overtime, however, this scale may erode and expose metal material in the pipes directly to the fluid being conveyed, which can lead to corrosion. Chemistry associated with the fluid being conveyed can also break down scale and/or facilitate this scale erosion and corrosion. In the context of water distribution (and cooling systems based on water), heat, temperature, mineral content, sanitizers present, pH, and even generalized factors such as time of year and source selection can greatly influence scale erosion and corrosion. In accordance with some embodiments described herein, stannous material can be added where scale is already present in piping, but may be in the process of eroding, and can be used as a thin surfactant to prevent further scale degradation.

Several further terms used herein should also be introduced. First, "circuitry" can refer to analog or digital electronic elements (e.g., dedicated logic gates), either arranged as special purpose circuitry that necessarily performs a certain function when electrically motivated, or as general purpose circuitry (e.g., one or more processors) that is controlled or otherwise configured by instructions (software) so as to adapt that circuitry to perform a specific function and cause that circuitry to operate as though it was special purpose circuitry; as this statement implies, "circuitry" can include special purpose circuitry as well as one or more general propose processors (i.e., controlled by firmware or software to function in a certain way) as well as a combination of the two. "Processor" as used herein refers to a set of configurable hardware circuit elements or hardware circuit elements that can be controlled to perform any one of a number of different functions including, without limitation, an FPGA, microprocessor, microcontroller, whether or not embodied in a standalone die or as a discrete integrated circuit. "Instructions" and "software" typically refer to instructional logic for configuring and/or controlling operation of a processor. Such instructions are typically written or designed in a manner that has certain architectural features such that, when those instructions are ultimately executed, they cause the one or more general purpose circuits or hardware devices (e.g., one or more processors) to perform certain described tasks. "Logic" can refer to software logic (i.e., instructional logic) or hardware logic (e.g., a digital chip or board design) or a combination of these things. "Nontransitory" "media" or "storage" means any one or more tangible (i.e., physical) storage mediums, irrespective of the technology by which data on each such physical medium is stored; for example, instructions can be stored on non-transitory (physical) media in optical form, magnetic form, electronic form, and so on; examples of physical media include, for example, and without limitation, random access memory, hard disk memory, optical memory, a floppy disk, DVD or CD, server storage, volatile memory, memory card and/or other tangible mechanisms where instructions may subsequently be retrieved by a machine (such as one or more processors); tangible media does not include transitory media such as carrier waves, for example. The nontransitory media can be in standalone form (e.g., a program disk, solid state memory card, whether bootable or executable or otherwise, or in other memory) or embodied as part of a larger mechanism, for example, a laptop computer, portable or mobile device, server, data center, "blade" device, subsystem, electronics "card," storage device, network, or other set of one or more other forms of devices, and embodied as either a single medium or as a set of collocated or distributed media (e.g., one or more such mediums). Instructions stored on nontransitory media can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. As a further example, "instructions stored on non-transitory machine-readable media" typically refers to software, firmware or other instructional format stored on disk or in other physical memory or storage, where the instructions are such that when they are later installed or executed by an operator or end user, or used to configure circuitry, they cause that circuitry (e.g., machine, one or more processors, e.g.) so that they are then operable to operate/function in a prescribed manner. As implied by the statements above, in one implementation, instructions on non-transitory machine-readable media can be executed by a single computer or processor and, in other cases as stated, can be stored and/or executed on a distributed basis, e.g., using one or more servers, clients, or application-specific devices, whether collocated or remote from each other. Each function mentioned in the disclosure or FIGS. can be implemented as part of a combined program or as a standalone component, e.g., a software module or an invocable or callable program or subroutine, and either stored together on a single media expression (e.g., single floppy disk) or on multiple, separate storage devices, or in the form of dedicated circuitry or circuitry combined with such software. Throughout this disclosure, various processes will be described, any of which can generally be implemented as instructional logic (e.g., as instructions stored on non-transitory machine-readable media), as hardware logic, or as a combination of these things, depending on embodiment or specific design.

"Module" as used herein refers to a structure dedicated to a specific function; for example, a "first module" to perform a first specific function and a "second module" to perform a second specific function, when used in the context of instructions (e.g., computer code), refer to mutually-exclusive code sets; these code sets can be embodied as different code portions (e.g., different sets of lines in a common-program, or different routines embodied as respective parts of a common library) or otherwise as respective standalone routines, programs or files. Note that this does not require complete independence from other code, e.g., a "module" in the software context may call standard functions or code sets which may also be called by other software "modules." When used in the context of mechanical or electromechanical structures (e.g., a "sample preparation module"), the term module can refer to a dedicated set of components which might include hardware as well as software); for example, an "encryption module" and a "network registration module" would refer to dedicated, mutually exclusive components for scripting tasks of encryption and network registration, respectively, and they might be discrete code sets or have discrete mechanical structures, or both, depending on context. In all cases, the term "module" is used to refer to a specific structure for performing a function or operation that would be understood by one of ordinary skill in the art to which the subject matter pertains as a conventional structure used in the specific art (e.g., as a software module or hardware module as those terms would be understood in the context of computer and/or software engineering and/or circuit integration), and not as a generic placeholder or "nonce" or "means" for "any structure whatsoever" (e.g., "a team of oxen") for performing a recited function (e.g., "encryption of a signal"). "Mechanism" as referred to herein refers to a unit that operates by mechanical action of some type and, once again, encompasses structures that would be ordinarily associated by those skilled in the art with a given type of function; for example an "automated sample extraction mechanism" typically refers to an electromechanically actuated mechanism that draws a liquid sample, typically of a defined volume, from a network of interest for purposes of testing and/or measurement as described herein, and can includes some type of vessel to store the sample and a motion activated syringe, electronically-controlled bleed valve, or some other type of electrically-controlled structure that is operated mechanically to draw a sample of interest. "Electronic" when used to refer to a method of communication can also encompass types of audible, optical or other communication functions, e.g., in one embodiment, electronic transmission can encompass optical transmission of information (e.g., via an imaged, 2D bar code), which is digitized by a camera or sensor array, converted to an electronic digital signal, and then exchanged electronically. Generally speaking, reference will be made herein to instructions such as computer code which, "when executed," cause one or more processors to perform a specific task; this usage should be interpreted as referring to the intended design and operation of software (e.g., such as might, following software sale and/or distribution, be installed and executed by a software licensee or an end-user). An "engine" in the context of this disclosure typically includes code for performing a discrete set of tasks typically configured as a subroutine or function call; for example, a "rules engine" refers to a code set that manages and applies rules, which may be stored in a database, and takes or triggers actions specified by the rules. "Sanitization agent" as used herein means any substance used to treat a fluid to inhibit or eliminate biological agents as well as a byproduct of such agents; for example, a sanitization agent commonly used for water is chlorine, and its byproducts can include among other things trihalomethanes (THMs), haloacetic acids, haloaldehydes, haloacetones, haloacetonitriles and chloral hydrate. This disclosure uses the term "sanitization agent" to refer to these things because these are common sanitization byproducts tested for in a water distribution network and their presence can potentially be a factor in corrosion and/or distribution network health. THMs, in particular, head the USA EPA list of toxic and carcinogenic compounds highly regulated in drinking water and can include specific THM species of chloroform (CHCl3), bromodichloromethane (CHBrCl2), dibromochloromethane (CHBr2Cl) and bromoform (CHBr3). A "network" or "system" as used herein, when referring to a distribution or recirculation of fluid, typically refers to a set of components used to transport a fluid (e.g., liquid) for a particular application, i.e., it can include one or more pipes, joints, fixtures, conduits, channels, tanks or other storage elements, valves, chambers, cisterns, reservoirs, ducts, etc., which cooperate to distribute and/or recirculate the fluid (for example, a system that recycles distributed liquid for heating or cooling applications. "Network" may also be used herein to refer to a computer network e.g., a local or wide area network, and it may also be used herein to refer to a fluid network (i.e., meaning a system of pipes, conduits or other structures for transporting the fluid in a controlled manner); for example, in the context of a potable water distribution network, a fluidic network can include pipes, conduits, joints, pumps, tanks, fixtures, and many other types of elements used to distribute water from a first location to a second location. A "joint" or "junction" refers to a coupling between two different elements (e.g., different types of pipes). A "fixture" refers to an element in a network of interest with a predetermined function other than simply to transport fluid of interest, for example (and without limitation), a faucet, a valve, a storage tank, coil, a heat exchanger, an orifice, etc. A "test carrier" refers to an element that is used to model or serve as a proxy for one or more elements in a network, for example, for one component of a fluid distribution or recirculation network up to an entire network (including all of its constituent components); a "coupon" more specifically refers to an element intended to serve a model or a representative sample for a specific network, e.g., a specific pipe, fixture or material that is still in service or is to be used as part of the network. The term "coupon" it includes by way of nonlimiting example a representative piece of piping from a fluidics system of interest which has been removed and which is to be used to model one or more structures in the network. "Environmental parameter" refers to any variable associated with or that can characterize the fluid being analyzed or modeled, directly or indirectly, e.g., it can include without limitation, time of day, flow rate, season, date, pH, alkalinity, concentration of certain materials, source identity (e.g., reservoir, cistern, river, an individual specific source (e.g., a specific river, reservoir, aquafer, well, etc.), concentration of metals or other materials, sanitizer presence, age or time, treatment history, presence of biofilms, and potentially any one of a myriad of other parameters.

Also, one or more documents may be incorporated by reference into this disclosure. Operations set forth in this document, and any definitions set forth in this document, should be construed to predominate, in the event of any conflict in usage or meaning as between this document and any incorporated-by-reference document. This is to say, structures and operations may be incorporated by reference from other documents, but definitions set forth herein are to control and supersede any inconsistent definitions from the incorporated by reference documents.

FIG. 1A shows a first embodiment a system 101 that adds stannous ion to a fluid of interest (typically an aqueous matrix, which will be assumed to be potable, sea water or wastewater in one example). Water enters from an inlet 102, seen at the left side of the FIG., is processed, and provided to an outlet 103 (103' in some embodiments). As part of the processing, at node 105, stannous material is locally generated (e.g., by electrolysis) and injected into the water in soluble form, as indicated by an arrow 106; being soluble, the stannous material ready mixes with the water and flows throughout the fluid distribution/recirculation network 101; note that depending on embodiment, elements may be used to enhance mixing and distribution of the stannous material. The stannous material does not completely react instantaneously and is readily delivered throughout the flow/distribution path of the fluid of interest, i.e., is conveyed in soluble form to substantially all fluid interfacing surfaces in the fluidic network of interest. These surfaces, including without limitation all piping in the system, is conceptually depicted in the fluidics system by a tank icon 107, seen in FIG. 1A (i.e., this icon conceptually represents any surface that will come into contact with the water, i.e., whether or not a "tank"). The stannous ion will oxidize in proximity to these surfaces, to form insoluble tin dioxide, and will facilitate reaction with specific metal species that may be present in the water, for example, as described in our incorporated by reference document USPB 20200207645, for example, triggering the conversion of hexavalent chromium (CR6 or CRVI) to trivalent chromium (CR3 or CRIII). As part of this reaction, or in connection with this reaction, the tin dioxide will adhere to the inside of piping, forming a thin protective film. The tin dioxide is typically in the form of colloidal particulate and, to the extent is does not adhere to piping surface, is optionally filtered downstream, for example, at filter 109. In a potable or wastewater system, for example, clean water can then be passed to output 103. Note that this particulate typically has a size of greater than 1.0 microns. In some embodiments, a second filter or higher order filter 129 can be used downstream from the first filter 109; in this event, filtered effluent is output at location 103', with any of the depicted filters (i.e., filter 109 or filter 129) being optionally cleaned in situ, via an automated backwash process. Where multiple filters are used, then can optionally be cascaded in filtration function; for example, primary filter 109 can be chosen to filter particles smaller than a first selective size (e.g., greater than 1.0 microns), where this size is chosen to remove a selected percentage of overall expected particulate volume (e.g., to remove 90%+ of expected particulate). A second filter can be passed relatively clean water but can feature fine filtration capacity, for example, filtering particles between 0.5 and 1.0 microns, with this cascaded relationship serving to minimize cleaning frequency required for any given filter. In other embodiments, more than two cascaded filters can be used, each sized to remove a respective percentage of expected particulate, with any one or more of them the subject of in situ cleaning, automated cleaning cycles. As represented by dashed-line paths, 115 and 130, optionally, the filters 109 and 129, can also act as a separators that harvest residual tin dioxide, with optional reuse of the separated tin dioxide to process incoming water (i.e., thereby reducing or minimizing the amount of stannous ion that might otherwise need to be injected into the system at node 105 to foster desired effects). For example, a backwash process can be used to renew filters 109 and 129 and to also carry separated tin dioxide to a preprocessing system 117, for stirring/mingling with water from inlet 102. The tin dioxide so-recirculated can further enhance the metal-species conversion referenced above by contributing tin dioxide at a juncture upstream from injection node 105. When there is too much tin dioxide, when the tin dioxide loses its chemical effectiveness, or when another milestone is reached (e.g., a calendared event), the preprocessing system 117 can be cleaned, with tin oxide sediment or sludge being removed via outlet 119. Note that not all depicted elements are required for all embodiments; for example, it is expressly contemplated that a filter might be omitted in a recirculatory system, e.g., with stannous material being added only as necessary to provide minimum dosing, and with tin dioxide remaining in the system to promote a long-lived, consistent tin dioxide presence. In alternative embodiments, port 119 can be used to frequency harvest tin dioxide (e.g., for use in flue gas scrubbing, as well be described below).

FIG. 1A shows use of a number of further, optional components. First, a level sensor 121 ("L") can be used within the preprocessing system to determine when it is time to remove accumulated tin dioxide or otherwise perform maintenance for the preprocessing system 117. Second, as noted previously, in many embodiments, regulated electrolysis can be used as the dosing mechanism, i.e., to generate stannous ion in situ, to achieve a controlled result, predetermined concentration of soluble tin concentration, no more than a threshold level of a target metal, and so forth; with such an electrolysis system, electrodes, typically composed of food grade tin, are dissolved under applied electric current to cause the tin to dissolve over time into the water according to the applied electrical stimuli. See, for example, the aforementioned US Patent Publication, (USPB 20200207645), which provides copious detail for dissolving tin electrode configurations. That publication alludes to dissolving only enough tin so as to maintain sufficient reagent for conversion of a metal species of interest which is to be removed from the fluid of interest and, to this end, an ultrasound cleaning system can be used to maintain peak reagent generating efficiency and close correspondence between electrode drive and stannous material dosing. Employed in connection with systems described herein, stannous material is generated in situ to maintain a threshold thickness of tin dioxide surfactant on piping surfaces. Contrasted with systems that disinfect water (and where trace amounts of silver or other metals are added to water), high regent generation efficiency, with automated electrode cleaning and related levels of electrolysis can be used to maintain a precisely a target amount of stannous material and/or thickness of tin dioxide surfactant within piping 107 while at the same time avoiding waste and maximizing electrode lifetime. To accomplish these various ends, an electrolysis-based reagent generating system 123 (labeled "R" in the FIG.) controls the amount of stannous material added to the system by throttling levels of electrolysis so as to maintain desired thicknesses of tin dioxide surfactant. In yet another embodiment, an electroanalytical sensor ("E") 125, can be used to measure pipe health (i.e., health in piping 107) by measuring the extent to which metal surfaces come in contact with water, and using differential measurement techniques, to measure and track scale health as well as thickness/health of a tin dioxide protective layer. Further details will be presented below as to exemplary configurations and uses of this sensor and to determining tin dioxide thickness. Numeral 126 refers to a metal sensor ("M"), which can be optionally used downstream from piping of interest (107), for example, to detect trace amounts of corrosion species in water (e.g., lead, copper, iron, chromium, etc.), with the measurement point either being prior to or after filter 109/129. For example, sensor 126 can be configured to measure concentrations of these specific metals. In large volume or commercial applications, this sensor can optionally be implemented as a mercury dropping electrode, with supporting chemistries to measure trace amounts (e.g., parts per billion, or PPB) of a target metal such as residual lead, copper, iron or chromium. It is also possible to use other types of metal sensors, and/or to configure a metal sensor so as to sense the amount of tin present in the fluid of interest (again, before or after filtration, as desired). Numeral 127 refers to one or more pressure sensors, for example, configured to detect whether there is excessive pressure or resistance in pushing water through filters 109/129, suggesting that it is time to clean one or more of the depicted filters. Numeral 128 refers to one or more pumps, which can be electronically actuated (for example, to backwash one or both of filters 109/129) as part of an automated or manually-triggered cleaning cycle that renews these filters and that disposes of, or harvests/recirculates, as desired, separated particulate.

The various systems, sequencing of actions, and selection of intermittent or optional actions are orchestrated by an electronic control system, typically as one or more processors with suitable firmware or software (although it is also possible to use other forms of circuitry, for example, dedicated hardware circuits that are not configured according to instructions). A control system is represented in FIG. 1A via an electronic device graphic 129. In one embodiment, such an electronic device manages system operation, controlling dosing of stannous material as necessary; the logic used by such a device (e.g., software) is configured to interact with the various referenced sensors to throttle levels of electrolysis and by determining when maintenance is needed, for example, on electrodes, filters, separators, and other system components. As noted earlier, in some embodiments, these maintenance cycles can be automatically initiated (e.g., responsive to sensor inputs or at calendared intervals) or in response to operator command, prompted or otherwise. For example, the electronic control system can be configured, in some embodiments, to generate an alert for an operator when filter maintenance is needed, by turning on a light, generating an audible sound, displaying a software button, or even via more sophisticated action such as generating a text message or alert email. As implied by the use of a 'smart phone' representation of the control system 129, in one embodiment, the control system can be partially or completely instantiated in the form of a computer or smart phone running suitable software, optionally, using an application (app) specific to the purpose of controlling the overall system 101. In some embodiments, as implied by the 'smartphone depiction' and this reference to software, in some embodiments, these acts can be taken under the auspices of instructions stored on non-transitory (i.e., physical) machine-readable media.

Figure 1B:
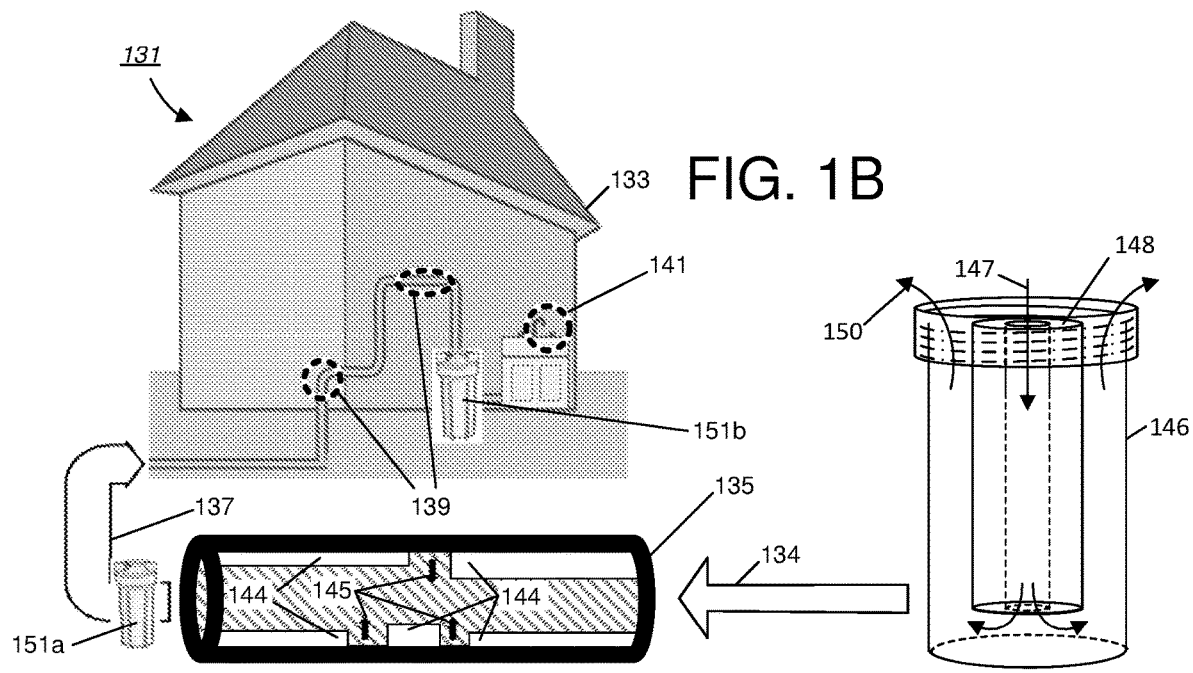
FIG. 1B is an illustrative diagram showing use of a stannous electrolysis treatment system to treat a water distribution system. A stannous generator can be installed upstream from aged piping, such as a lead or copper pipe section of interest 135, with filters 151a/151b optionally installed downstream as desired to remove residual stannous material or residual tin dioxide. In a situation where the pipe of interest 135 represents an aging city pipe, for example, a filter 151a might be installed at, or upstream from, a point 137 where the city connects its supply to a customer; in such a circumstance, or alternatively, where it is desired to treat pipes of a private facility, a filter 151b might be installed closer to a delivery point, for example, at an individual apartment connection point or at a delivery point (e.g., at a tap for drinking water). The depicted implementations are exemplary only.

FIG. 1B is used to explain benefits of use tin dioxide generation, by way of nonlimiting example, using an electrolysis-dosing and filtration-based components similar to those seen in FIG. 1A. FIG. 1A illustrates a configuration 131 in which a house or building 133 is to be supplied potable water via a suspect pipe 135. The pipe is suspect because it possesses the potential to release undesired metal species into the drinking water, including by way of example, lead, copper, iron, selenium, chromium or other metals, or compounds based on these metal. The pipe may be somewhere in the network of a water distribution company (for example, part of a city-maintained water delivery pipe) or it may be on private premises such as underground or somewhere within in the depicted house or building 133; for example, the pipe can optionally represent corroded material at locations 139 within the depicted house. Again, note that while a 'pipe' 135 is illustrated in the FIG., this representation should be understood to be any surface that comes into contact with fluid (e.g., water) during transport, for example, a container, tank, joint, solder, radiator (heat exchanger), valve, or indeed, any other fluid transport mechanism, such as a plumbing fixture represented by numeral 141. It should also once again be noted that, while FIG. 1B represents a one-time distribution system for water, the same principles also apply to contemplated applications of a recirculatory network (for example, a closed cooling system of some type), and to systems where fluids other than water (including liquids and gasses) represent the fluid of interest.

Water enters the suspect pipe 135 as indicated by flow arrow 134 and then proceeds via path 137 for end-point distribution at location 141. It should be assumed that it is desired to facilitate buildup of a surfactant film (tin dioxide) at one or more of these points 139 where there is risk for corrosion. For example, the suspect pipe 135 is illustrated in enlarged, cross-sectional detail, so as to illustrate partial coverage by an interior layer of protective/mineral scale 144, but featuring certain areas 145 where this scale has been eroded, and metal material of the pipe 135 directly exposed to water. This can be of greater concern for some systems, given variable water chemistry, than others; for example, where pipe 135 has a high lead content and suitable conditions exist, water may cause lead corrosion or building up of biofilms (which may further cause corrosion), but this concern might be less for the same conditions where piping is made out of copper. The corrosion potential can also vary according to water source, temperature, time of year, pH, sanitizer concentrations present, mineral content present, and many other factors. The same can be true for other types of pipes or transport surfaces, e.g., valves versus pipes versus radiators, to cite a few examples. Note that it may not be feasible to replace pipe 135; for example, this exemplary corrosion could be deep below ground, within a wall, at an unknown location within a large area, or represent widespread degradation.

In accordance with principles disclosed herein, in one embodiment, stannous material is introduced by electrolysis into the system upstream from the pipe, via electrolysis system 146, and filtered (e.g., with other waste metal or other colloidal particulate) at filter location 151a or 151b for aesthetic and other purposes. Once again, the electrolysis system can be a dissolving-electrode stannous ion generator that features slowly-dissolving electrodes made of food grade tin, with electrolysis regulated automatically by a control system so as to throttle dissolution of food grade tin at a controlled rate that depends upon various parameters. Tin dioxide formed from the soluble stannous material will (in addition to facilitation reaction and sequestration of corroded metal) adhere to exposed surfaces within the suspect piping to form a thin, persistent film. The system 146 depicted in FIG. 1B is based on concentric piping, for example, corresponding to one of the embodiments of our earlier US Patent Publication (USPB 20200207645) which has been incorporated by reference, but any of our other disclosed specific embodiments (or other configurations) may also be used. Water flows into the depicted system via an axial inlet 147, with pipe walls slowly dissolving under applied electrical stimulus, and concentric outflow as represented by numeral 150. The electrodes are optionally cleaned to maintain peak reagent generation efficiency, and are advantageously used in connection with sensors that detect when a dissolving electrode is worn out, and needs to be replaced; note that this can be done in a number of ways, including without limitation based upon electronically monitoring electrode performance (e.g., current flow), detecting excursions in concentration of detected metal species, detecting falling Sn levels, and/or using other techniques. Water having stannous ion and developing tin dioxide flows into pipe 135, with insoluble tin dioxide coating surfaces, and is also carried by the water to filtration system 151*a* and/or 151*b*. Tin dioxide typically manifests as cloudiness in the liquid, and these filtration systems advantageously remove substantially all particulate greater than approximately 0.5 microns in size, leaving potable water that is substantially free of both tin dioxide and corroded metal.

Figure 1C:
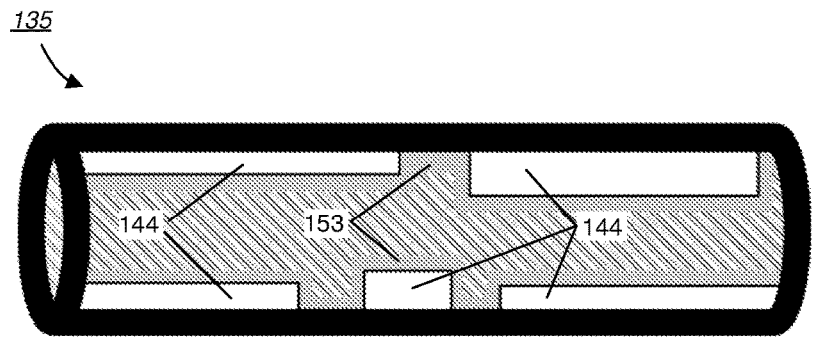
FIG. 1C illustrates a hypothetical pipe section having interior scale 144 and a thin tin-dioxide surfactant layer 153. This FIG. replicates a pipe 135 from FIG. 1B, but as represented by FIG. 1C, following addition of stannous material to a distributed or recycled fluid, a relatively soft, thin layer of tin dioxide 153 is formed as seen. Tin dioxide presents an advantage that it forms a relatively thin, durable layer that can be used to arrest further degradation of interior scale 144 and resist pipe metal corrosion (including without limitation, corrosion of lead, iron, copper, and other metals from pipe material).

The effects of this process are better seen in FIG. 1C, which shows an enlarged depiction of the suspect pipe 135, but now seen with a thin, persistent tin dioxide film 153 deposited on the fluid conveying surfaces of the pipe. This is to say, in one embodiment, this film can be deposited so as to protect existing mineral scale as well as to mask any exposed metal surfaces. In other embodiments, scale can first be removed, adjusted or managed as to a desired thickness, prior to building up a tin dioxide layer. Naturally, the chosen process will vary depending on application; for example, for a potable water distribution system, it may not be practical to use specific processes to change mineral scale, whereas this might be more practical (and important) for some recirculatory systems (e.g., certain heating or cooling systems).

Figure 1D:
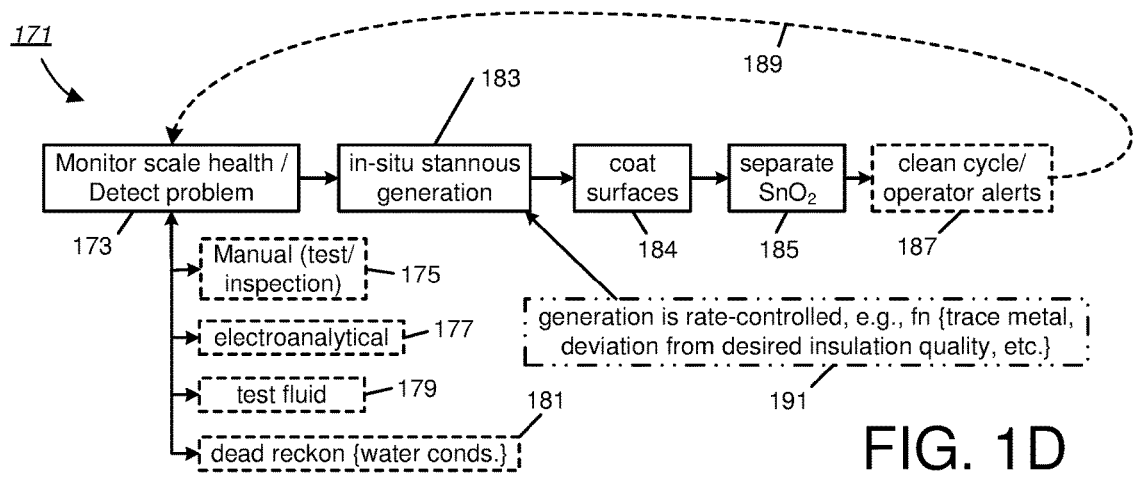
FIG. 1D shows some method steps associated with pipe treatment and/or stannous material generation in a fluid.

FIG. 1D provides a block diagram 171 showing techniques used in connection with the systems and applications exemplified in FIGS. 1A-1C. Not all of the depicted blocks or steps are required for any implementation, and expressly contemplated embodiments mix and match any of the depicted steps, in any desired combination or permutation with any structure or combination of structures disclosed herein. Per numeral 173, the depicted process begins by detecting a problem, such as loss of scale health, detected presence of corrosive species, or conditions that have been previously correlated with current or future loss of mineral scale, biofilm formation, corrosion, and so forth; as a non-limiting example of this, it might be that warm late summer months and the use of a specific well water source for a potable water supply have been previously correlated with propensity for prospective scale loss, high metal presence in water, piping corrosion, biofilm development, or other future conditions. As indicated by numeral 175, in one embodiment, monitoring for problems can be performed by manual test or inspection. For example, a water supplier or heat exchange system operator can physically cut into a section of piping or use inspection robots or cameras to ascertain piping conditions, including mineral scale thickness, presence of an existing protective surfactant (e.g., tin dioxide), and associated extent of coverage, and areas of corrosion and other pipe state conditions. Alternatively, per numeral 177, and as taught herein, it is also possible to remotely and/or electroanalytically test a fluid conveying surface. For example, as will be discussed below in connection with FIGS. 3A-3D, discussed below, scale layer health, presence or absence of $SnO_2$ surfactant or other insulative layers, and other parameters can all be tested electroanalytically. Per numeral 179, it is also possible to test the fluid itself, for example, for presence of residual tin dioxide, and/or for presence of corroded material or evidence of biofilms. As a nonlimiting example of this, and as described by our incorporated by reference US Patent publication (national stage entry of PCT/US2020/050773, introduced earlier), voltametric techniques can be used to test for residual copper, lead, chromium, iron or other metals downstream from possible corrosion. Finally, per numeral 181, and as also described by this latter incorporated by reference document, is also possible to dead reckon corrosion conditions, for example, based on known empirical data representing correlation between corrosive effects of certain materials in the distribution/recirculation system and current, expected or historical fluid environmental parameters. Whichever technique is used, in situ stannous generation 183 can be employed to inexpensively transfer stannous material to the fluid of interest in controlled amounts, in soluble form in the case of liquids, and to distribute effectively distribute stannous material throughout a fluidics system of interest (or piping of interest). Tin dioxide then builds up in situ, acting as a surfactant for one or more surfaces of interest, per numeral 184. The fluid of interest, with residual tin dioxide, is then optionally filtered to separate that tin dioxide, per numeral 185, with clean cycles, operator alerts or other control actions being effectuated as appropriate, per numeral 187, to maintain the system, clean electrodes, alert operators as to the need for maintenance or electrode replacement, initiate automated (e.g., ultrasound) electrode cleaning cycles, trigger filter or system backwash cycles, and/or identify undesired conditions (e.g., undesired metal species in water). As referenced earlier, and as referenced by numeral 189, separated tin dioxide can optionally be recirculated and reintroduced into the system, for example, upstream from the in-situ stannous generation, 183.

Note once again that in many embodiments, the rate of stannous ion generation is advantageously rate throttled and/or controlled according to feedback or detected conditions—that is, the rate of dissolution of tin electrodes (and associated stannous production) can be adjusted in response to detected metal (e.g., concentration of lead believed to be present in water), desired insulation layer properties (e.g., deviation from target $SnO_2$ layer thickness), in response to fluid environmental parameters or in response to other factors; as an example, if it is desired to remove all trace of lead from a potable water supply, and if trace quantities of e.g., 10.0 parts-per-billion ("PPB") were detected, in one embodiment, stannous ion generation can be more aggressively driven than if e.g., 2.0 PPB lead concentrations were detected, i.e., to provide levels of reagent generation that are sufficient to meet desired objectives (e.g., <0.10 PPB concentration) while maximizing electrode tin electrode lifetime and minimizing filtration requirements.

Figure 2:
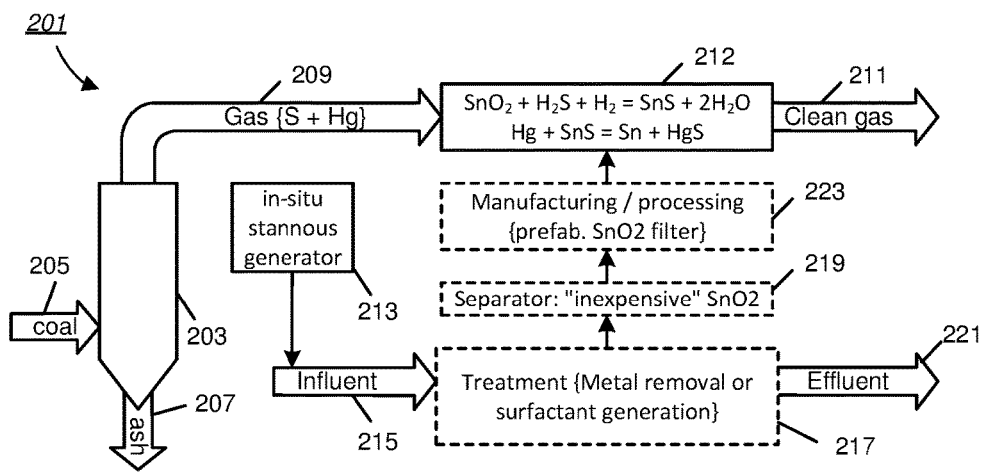
FIG. 2 shows an optional further application for tin dioxide produced from electrolysis and fluid treatment; in this example, tin dioxide is produced as a deliberate product, where electrolysis is used to create stannous material in a fluid of interest, and that fluid of interest and a fluidics system are arranged to transport tin dioxide to a harvesting or collection point. In this depicted case, harvested tin dioxide is then applied (e.g., locally) to flue gas desulfurization and mercury scrubbing processes. Use of electrolysis provides an effective, inexpensive means for distributing stannous material in soluble form, but it also provides an inexpensive mechanism for producing tin dioxide as an insoluble by-product, and fluidic system design can be structured in a manner advantageous to the separation and harvesting of tin dioxide at a defined location. Excess tin dioxide can optionally be processed, i.e., so as to form a modular filter material for a scrubber.

FIG. 2 illustrates another application of optional techniques in an embodiment generally referenced by numeral

201. More specifically, the techniques taught herein can be applied as an inexpensive, ecofriendly and efficient method of generating tin dioxide as a desired end product. Tin dioxide has a number of uses, in addition to being a bioagent, including use in flue gas scrubbing processes to remove mercury and sulfur. Such an application is illustrated in FIG. 2, which shows a furnace 203 that receives and burns coal 205 and the produces ash as a by-product. "Dirty" gas, that is, having sulfur and trace mercury is produced from such a furnace as indicated by numeral 209, and it is desired to scrub this dirty gas to obtain "clean" gas that can be recycled or released into the environment, per numeral 211. This scrubbing process is illustrated at a chemical process block 212, where it is observed that tin dioxide readily reacts hydrogen sulfide to produce tin sulfide and water (the tin sulfide is an insoluble precipitate that can easily be separated from both gas and water), and where it is observed that tin sulfide also readily reacts with mercury to produce mercury sulfide (another inert, easily separated compound) and elemental tin. The techniques taught herein can be applied in situ to generate tin dioxide (e.g., by a company operating a furnace), as well as to recycle that tin dioxide into elemental tin (e.g., for further recycling reuse in a water treatment process). Optionally, tin dioxide harvested from a water treatment process can be formatted and/or packages as a modular filter element 223, such that panels or other consumables having a predetermined shape or format can be directly introduced into a specific manufacturing process.

To this end, an in-situ stannous generator 213 is once again operated to provide stannous ion to an influent 215 which, once again, may optionally be water. In this influent, the stannous material is oxidized to form tin dioxide as part of some type of treatment process 217; as a non-limiting, optional example, the stannous material can be produced in regulated amounts for soluble form distribution to provide locally-formed tin dioxide surfactant at a threshold thickness—1.0 to 10.0 microns for example, to coat fluid-conveying surfaces of interest. Note that in experiments, a 1.0 micron thick layer of tin dioxide has shown results of reducing metal corrosion from pipe surfaces by approximately 80% (i.e., relative to cases where no surfactant is present). Such a layer can be built up for example with a stannous material concentration of 2.0 PPM (parts-per-million) over a period of approximately 24-30 hours, and it is expected that thicker layers, created for longer exposure periods, will reduce rates of corrosion in otherwise susceptible piping to near zero. The tin dioxide manifests as a soft sludge that tends to endure absent mechanical scrubbing, i.e., such that an initial treatment period followed by low concentration dosing or intermittent repeated dosing for maintenance, is expected to suppress corrosion to desired levels. Again, excess tin dioxide can be separated/harvested and optionally recycled to other applications, per numeral 219, while separated effluent can be recycled or used for other purposes (e.g., potable water, as per some of the examples provided earlier). Optionally, the depicted system can be operated purely as an inexpensive process of tin dioxide generation.

Note again that while use of tin dioxide for purposes of flue gas scrubbing is one application, many other applications will naturally occur to those having ordinary skill in the art. For example, as exemplified earlier, relative to FIG. 1A, in one contemplated system, separated tin dioxide can be recycled and reused to treat influent, on a continuous basis, e.g., with tin dioxide being added upstream from a corroded or questionable pipe section (or to treat high metal content, e.g., in well water), and filtered downstream. Tin dioxide also has excellent microbial properties, and can be used in other processes as well.

Figure 3A:
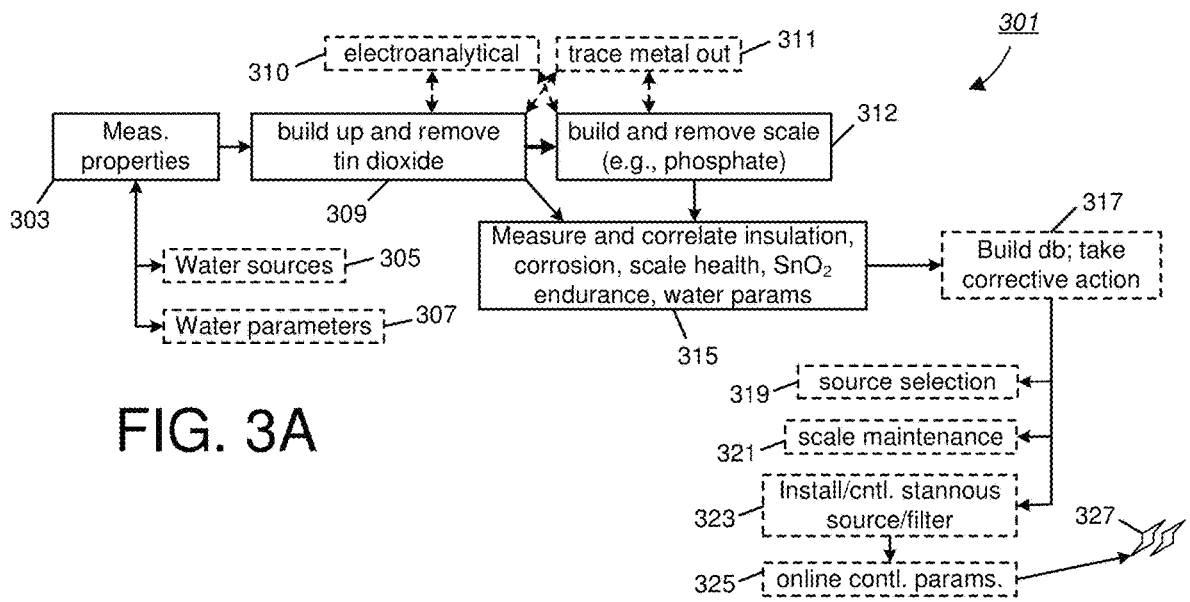
FIG. 3A is a block diagram showing steps associated with diagnosis of health/corrosion of one or more elements (e.g., pipes) in a fluidic network.

FIG. 3A is a block diagram of an embodiment associated with diagnosis of health/corrosion in a fluidic network, with techniques generally referenced by numeral 301. Generally speaking, one starts by measuring properties of one or more system, for example, health of piping or a specific pipe specimen, or by attempting to detect presence of corroded material which has been leached into the fluid of interest, per numeral 303. In some embodiments, these measurements can be carried out in situ, that in an actively used fluid distribution or recirculation network; alternatively, one or more piping specimens can be extracted from the network, e.g., cut out of a network for purposes of analysis, or representative material can be used. For example, a municipal water company might choose to model an inaccessible, aged section of piping by selecting and testing a metal pipe that, although not ever used in the fluidic network under analysis, has been selected as being "close to" the inaccessible pipe section in terms of material composition, properties and behavior. Naturally, these examples are nonlimiting. If desired, as represented by numeral 305, an operator might choose to experiment with different fluids, e.g., different water sources (e.g., well versus aqueduct, sanitized versus unsanitized water, and so forth), for purposes of modeling how they each contribute to expected corrosion. In addition or instead, an operator may choose to correlate behavior of a specimen with any of a myriad of environmental parameters characterizing the fluid of interest, for example, pH, mineral content, sanitizers present, temperature, and other factors, collectively represented by numeral 307. Naturally, while water is once again used as an example of a fluid, other types of liquids or gasses can also serve as the fluid or interest, depending on application (e.g., a chemical coolant, seawater used for nuclear reactor cooling, etc.). The specimen of interest is, in one embodiment, subjected to a series of measurement steps 309, where in each test iteration what is being measured is (a) electrochemical properties 310 (e.g., charge difference and/or conductivity, to effectively measure the degree of insulation between a contact point with pipe metal and fluid), (b) trace metals which are removed from the pipe and are found in the presence of effluent, 311, or (c) both of these things. Note that this is nonlimiting, e.g., in another embodiment, the specimen of interest can be weighed, with differences in weight coupled with optional optical characterization used to establish presence or absence of a tin dioxide surfactant layer. For each measured property, the specimen of interest is typically (1) measured to establish a baseline, (2) measured with and without tin dioxide layer build up, e.g., a layer can be build up and then completely stripped 309, to understand how that layer manifests in measured properties, and (3) measured with and without any desired mineral scale layer (e.g., calcium phosphate or other protective layer), per numeral 312. Each of these measurement sequences is advantageously repeated while varying one or more variables in order to correlate each variable with its effects on protective scale, corrosion, tin dioxide surfactant build up and longevity and conditions that influence surfactant degradation, all per numeral 315. The data from these measurements can then be used to build a database, per 317, to predict fluidic network reactions to various parameters, and optionally take actions as a consequence of detected or expected environmental parameters. For example, per numeral 319, fluid source selection can be varied in some applications dependent on correlation data; as a nonlimiting, illustrative example of this, if it was determined that a certain type of water sanitization agent enhances lead corrosion (or mineral scale breakdown, or tin dioxide stripping) during warm summer months and in the presence of high levels of sanitization, then an alternate water source could be selected during these summer months (or, alternatively, a different type of sanitization could be applied). As another illustrative hypothetical, if a municipality has a choice between well water or treated water and determines that a particular section of the city network is more likely to experience corrosion with the well water, that type of information can be factored into source selection for that portion of the fluidic network. Per numeral 321, actions can be taken to promote near, mid or long term piping health, for example, by introducing substances that help build a desired type mineral scale that will provide insulative properties between pipe metal and the fluid being conveyed. Per numeral 323, an electrolysis-driven stannous ion generator can optionally be used (e.g., employing principles earlier), to build or maintain a tin dioxide surfactant layer, either with or without underlying mineral scale. Note that a tin dioxide surfactant need not be generated throughout a fluidic network; if a large city determines that only a particular older section of a city has lead corrosion issues, for example, one or more stannous ion generators can be installed at points that are carefully selected to treat piping sections that are most at-risk for corrosion. Similarly, in a recirculatory environment, it might be decided to focus surfactant generation and application only in a particular section of the recirculatory network, e.g., in a heat exchanger. Per numeral 325, a database can used by a control system to automate network and/or stannous generation control. As examples, if correlation data combined with expected fluid conditions (e.g., water distribution "over the next three days") indicate an increased propensity for corrosion absent mitigatory actions, settings can be automatically provided to a stannous ion generator or tin dioxide supply device to increase output/tin dioxide generation during the period in question, for example, dependent on local pipe materials, expected environmental conditions, location and other parameters. Such remote control, e.g., via local or wide area network, is collectively represented in FIG. 3A by a lightning bolt symbol 327. Note that such remote control can be wired or wireless, and typically uses an electronic control system such as introduced earlier (see, e.g., device 129 in FIG. 1A).

Figure 3B:
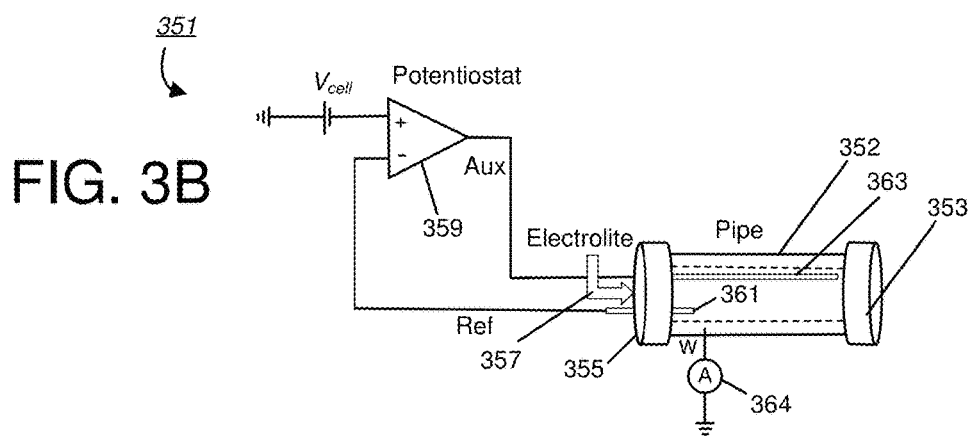
FIG. 3B shows an electroanalytical test arrangement that can optionally be used to assess scale health, propensity for pipe corrosion and/or tin-dioxide presence.

FIG. 3B shows an embodiment of an electroanalytical test arrangement 351 that can be used to test piping in situ or otherwise to assess performance of a representative pipe specimen. A pipe specimen (e.g., in situ, a representative section of pipe excised from a network, or metal material used to model a pipe) is depicted at 352, with end caps 353/355 seen as installed to permit optional testing of effects of different fluid dwell times. As represented by numeral 357, an electrolyte 357 can be injected into the pipe specimen, and a potentiostat 359 connected to measure electrical properties dependent on pipe metal, e.g., which vary depending on insulation between the pipe metal and electrolyte within the pipe specimen. The potentiostat is coupled to reference and auxiliar electrodes 361 and 363 which are inserted into the fluidic interior of the pipe and held at a desired potential difference. A working electrode 361 is coupled to pipe metal and feeds an amperometric device, so as to measure current flow as a function of pipe metal/electrolyte interaction. As should be apparent, if the pipe specimen is well insulated, current flow detected by the amperometric device 361 will be relatively less and, conversely, breakdown of insulation (i.e., as a function of loss of mineral scale and/or tin dioxide) will increased current flow according to the degree and thickness of coverage.

Note that other tests can be performed, and that the electroanalytical arrangement seen in FIG. 3B is illustrative only. For example, as noted previously, fluid passing through the pipe specimen can be measured to detect leaching of corroded metal into fluid passing through the pipe (e.g., using a dropping mercury electrode voltametric device, i.e., not represented in this figure, to measure trace metal). A pipe specimen can also be weighed or optically scanned in between tests to assess pipe interior conditions, including without limitation, presence or absence of a tin dioxide surfactant layer.

Obtaining baseline measurements and reference measurements for the pipe section with or without mineral scale and with or without tin dioxide film formation will permit assessment of where the subject pipe specimen lies on a continuum between little insulation and a high degree of insulation between pipe metal and transported fluid.

Figure 3C:
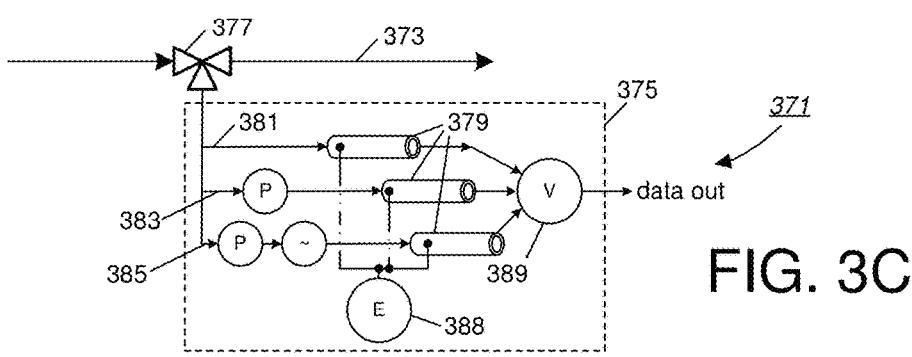
FIG. 3C shows a testing protocol for evaluating scale, corrosion, and/or tin dioxide health.

FIG. 3C shows another testing protocol 371 for evaluating protective scale health, corrosion, and/or tin dioxide surfactant thickness and health. Fluid is sampled by a testing mechanism 375 to measure effects of that fluid on pipe health. The fluid can optionally be drawn from a specific fluidic network of interest (e.g., a cooling system of a specific power plant), e.g., siphoned from a conveyance path 373 using a bleed vale 377, but this is not required for any embodiment. Optionally also, fluid parameters, including without limitation pH, temperature, sanitizer present (e.g., type and/or concentration), pipe specimen type (or ID), flow rate, pipe dwell time and other parameters, can be varied as desired during testing, with values of these parameters recorded for each testing iteration. FIG. 3C shows three different fluid testing protocols, each of which is passed through a specimen pipe 379 and is subject to one of or both of electroanalytical testing 388, testing of effluent for corroded trace metals using a voltametric device 389, or both. A first testing path measures a current condition of a pipe specimen 379, i.e., with no testing controls applied. A second testing protocol, represented by path 383, features application of a pipe passivation process ("P"), i.e., where a layer of mineral scale and/or tin dioxide film is built up using suitable chemistries injected into the test sample, for example, a closed-end pipe such as represented pictorially in FIG. 3A. A third testing protocol then features variance in environmental parameters (" "), e.g., fluids with selected temperature, pH, chlorine concentration and/or other known parameters, to assess the degree to which fluid having these parameters influence scale and/or tin dioxide breakdown following passivation. For example, these measurements can be repeated for different pH, chlorine concentration and temperature values, varying one of these parameters at a time, to develop correlation data as to how fluid chemistries and environmental parameters influence mineral scale, tin dioxide film longevity and breakdown, and corrosion. Note again that while the fluid of interest is assumed to be water, analogous processes can be performed for other fluids. For example, in a cooling system featuring a gas and trace chemistries that influence corrosion, effects can be measured for variable levels and variable combinations of levels for the trace chemistries. Measured data can be then used to build a database and, ultimately, to make decisions as to how a fluidics system (e.g., purportedly having the same or similar piping materials) should be managed as a function of current fluid chemistries and/or as to what remediation protocols ought to be applied.

Figure 3D:
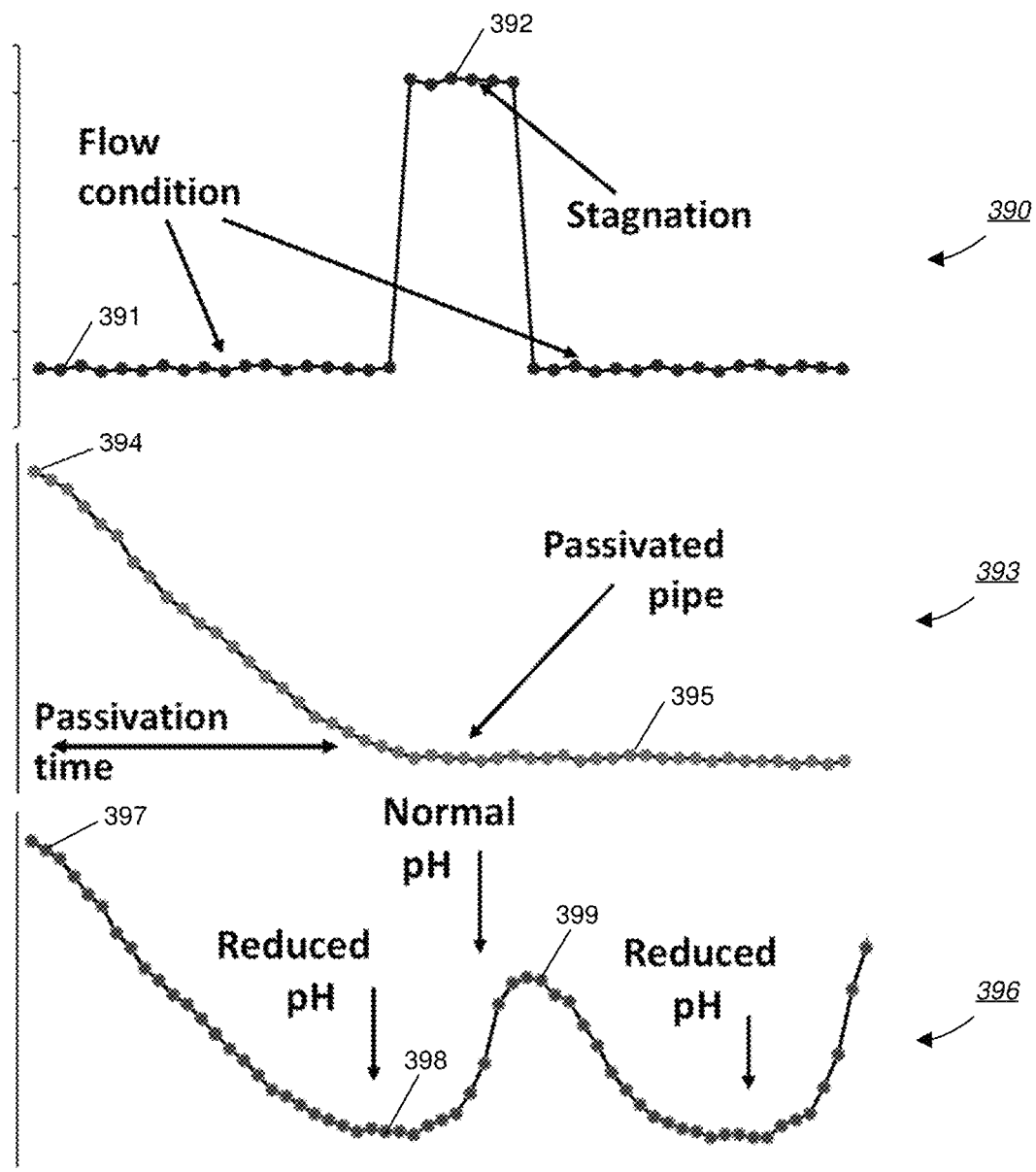
FIG. 3D illustrates a series of tests, 390, 393 and 396, for measuring conductance between metal of a pipe, solder or other fluidic network component and fluid in the pipe; the tests represented by FIG. 3D can be used to measure (a) propensity for corrosion of a pipe specimen, (b) mineral scale health and thickness, (c) tin dioxide scale and thickness, and (d) beneficial effects to be obtained from addition of a tin dioxide film.

The type of data obtained from these varying testing protocols will vary depending on the test conducted and what is being measured; for purposes of illustration, FIG. 3D represents an example of data that can be obtained from testing and how that data can be interpreted depending on what is being measured. FIG. 3D depicts three testing protocols. In a first protocol 390, a pipe section (i.e., without passivation) is subject to flow of a particular fluid with controlled period of flow and flow rate (numeral 391) and a period of stagnation (numeral 392); again, these protocols can be used for electroanalytical tests as well as downstream trace metal concentration measurement processes, and for example can represent levels of detected metal corrosion. This same testing can be performed for a passivated pipe at different times, per numeral 393, i.e., beginning with first application of a passivation process 394 for which a deliberately engineered mineral scale and/or tin dioxide surfactant layer of threshold thickness has been added; a passivated pipe experiences reduced residual metal (i.e., from corrosion) as passivation is performed, with a threshold level of passivation being obtained as indicated by the legend "passivated pipe," i.e. as represented by numeral 395. Finally, numeral 396 represents a third testing protocol in which an environmental variable is varied following steady state levels of passivation, e.g., from an initial condition (numeral 397) to a high level of acidity (numeral 398) an expected level of acidity (numeral 399), and so forth. In this figure, the varied environmental is seen to be pH, although any other environmental variables can instead be varied, including any variable identified herein (e.g., temperature, presence of a specific mineral, and so forth). Naturally, the nature of the data is someone different for various measured parameters (e.g., scale thickness, $SnO_2$ insulation, and so forth), and it is also possible to apply these or similar tests in any desired permutation. For example, tests 390 and 393 can be repeatedly performed for different tin dioxide surfactant thicknesses, to assess impact of surfactant thickness variation in corrosion species and corrosion rates. As noted earlier, surfactant thickness can be measured, for example, using an electrochemical test methodology, as represented by the structure of FIG. 3C, by optical processes or by stopping tests and weighting a specimen pipe; other examples will also occur to those having skill in the art.

Figure 4A:
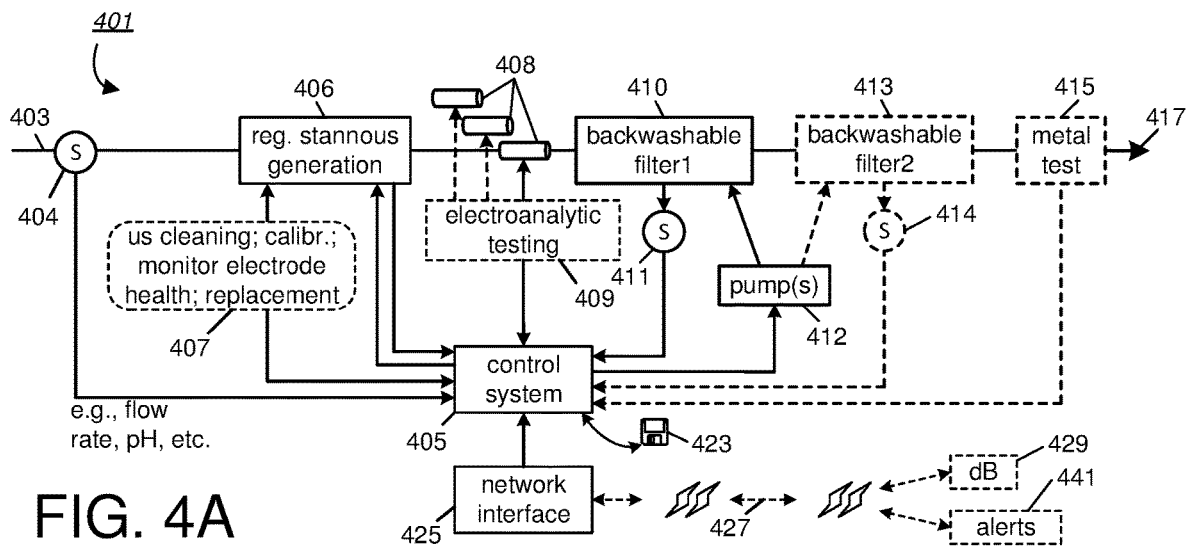
FIG. 4A is a block diagram of a stannous material generation system, according to one embodiment of the techniques presented herein.

FIG. 4A shows another embodiment of a system 401 that forms tin dioxide surfactant on at-risk pipping surfaces in accordance with techniques disclosed herein. An influent in a recirculatory or distribution system arrives at an inlet 403. Influent is tested by one or more sensors 404 for pertinent fluid flow and fluid environmental parameters, for example, flow rate, temperature, pH, optionally constituent materials present. These parameters are fed to an electronic control system 405 that adjusts stannous reagent dosing, for example, by providing variable electrode control as a weighted response to input parameters and time since last stannous dosing or otherwise based on dosing history; as noted earlier, such a generator can be based on dissolving tin electrodes that slowly erode over time and must be periodically replaced. The electronic control system advantageously monitors these electrodes for electrode health and reagent generation efficiency, as represented by feedback path 407. For example, as disclosed in PCT/US2020/050773, a stannous ion generator can be configured to detect efficiency of transfer of tin to water and/or can intermittently initiate electrode cleaning cycles using an optionally built-in ultrasound transducer, to maintain high generation efficiency and long electrode lifetime, and/or trigger other cleaning and/or replacement cycles. Generated stannous is distributed in soluble form within piping and oxidizes on piping surfaces, thereby creating tin IV ($SnO_2$), which coats the inside of fluid conveyance surfaces and forms a surfactant film that helps insulate piping metal. The stannous material, for example, travels in soluble form through one or more pipes 408 to coat interior surfaces; again, the term "pipe" and "piping" is used in a broad sense to include potentially any surface in the fluid recirculation or distribution network which will come into contact with the transported fluid, including without limitation, joints, pipes, tanks, heat exchangers, plumbing fixtures and so forth. Per numeral 409, electroanalytical testing can optionally be performed in situ, to periodically measure the efficacy of tin dioxide coating and effective internal insulation between metal pipe material and a fluid of interest at any given point in time, and as represented by the presence of multiple connection arrows in the FIG. In one embodiment, the control system 405 monitors a service line or pipe of concern at multiple points or monitors multiple such service lines or pipes. As noted earlier and in the incorporated by reference documents (see, e.g., PCT/US2020/050773), stannous material present in the fluid also facilitates reaction with certain metal species of interest, generally converting them to insoluble form, including without limitation trace copper and lead. Downstream of any pipes of interest, an optional, backwashable filter 410 receives fluid having tin dioxide and other particulate, which it separates from the fluid. In one embodiment, the backwashable filter is of a cascaded form, as discussed earlier, with a first stage configured to strain particulate having a size of approximately 1.0 microns in diameter or larger; the filter can feature sensors that provide for automated detection of the need for cleaning and invocation of automated cleaning and/or replacement cycles as appropriate. For example, a pressure sensor ("S") 411 can detect when fluid pressure rises inside the backwashable filter and/or when flow rates drop and the electronic control system 405 can responsively trigger reverse pumping action (via pumps 412) through the filter, to separate accumulated sediment for discard or recycling (see, e.g., path 115/130 from FIG. 1A). Note that a backwashable filter is not required for all embodiments, e.g., in some embodiments (especially those not involving potable water), a filter may be omitted or a different type of separation process can be used, and in still other embodiments, the filter can be a one-use filter that is adapted for discard or recycling and modular replacement. Advantageously also, in some applications, more than one filter can be used to filter fine particulate, with a cascaded filer design engineered so as to not unnecessarily impede fluid flow; For example, as illustrated in the FIG., a second backwashable filter 413 and an associated pressure sensor 414 can be used downstream first stage filter 410, in order to filter a non-overlapping or overlapping range of particulate. The illustrated second backwashable filter 413 in one embodiment can be selected to remove particulate that is between 0.50 and 1.00 microns. Similarly, a third filter can also be used in cascade, as can a fourth, and so on. Exemplary selection considerations will be further discussed below, in connection with the discussion of FIG. 4B. As indicated by optional test block 415, it is also possible to test fluid downstream for presence or concentration of metals that might suggest corrosion or a problem with the system. For example, test block 415 in one embodiment can represent a lead testing device configured to detect present of lead particles greater than some threshold level (e.g., 2.0 PPB, 5.0 PPB, etc.), with data similarly being passed to the electronic control system 405. With tin dioxide and other particulate being separated from the fluid, as optionally desired, the fluid can then be distributed or recirculated as an effluent, as represented by numeral 417.

FIG. 4A illustrates a number of optional features associated with system 401, some of which were alluded to earlier. First, in one embodiment, the electronic control system can include one or more processors and/or instructions stored on non-transitory machine readable storage media. Such storage media is a physical thing (i.e., not a carrier wave or transitory thing), that carries instructions that, when executed, configure hardware circuitry so as to operate in a certain manner. In one embodiment, the techniques disclosed herein can be embodied in instructions stored on one or more nontransitory mediums 423 that can be included with or downloaded to circuitry that will thereafter operate in accordance with the techniques described herein. Second, as noted earlier the system 401 and/or electronic control system 405 can be optionally configured with a network interface 425, for example, a local area network ("LAN") or wide area network ("WAN") connection so as to interact with a network, for example, the Internet (i.e., represented conceptually by numeral 427 in the FIG.). The control system optionally can be remote from other system components, and can use this interface to remotely communicate with various system elements (e.g., a remote filtration system, stannous generator, backwash pump(s) or various sensors), as has been described above, or can interact with one or more remote servers or database structures, represented by numeral 429. For example, a water company might choose to post data relating to predicted water parameters including temperature, expected mineral content, pH, sanitizers present, and so forth, any of which or all of which, in one embodiment, can be downloaded to a local stannous dosing/pipe health monitoring system, for local application of scripted control parameters. This network connection can also optionally be used to generate operator alerts, for example, as to needed maintenance, filter replacement, need to harvest collected tin dioxide, electrode replacement, excessive metals present (e.g., exceeding safe levels), and so forth, depending on embodiment. As a non-limiting example of some of the techniques discussed above, the system 401 can in one application be located in a private residence or building and be in connection with a municipal water company so as to vary stannous generation parameters in response to expected or local water conditions, for example, water particulars expected during a heat wave.

Figure 4B:
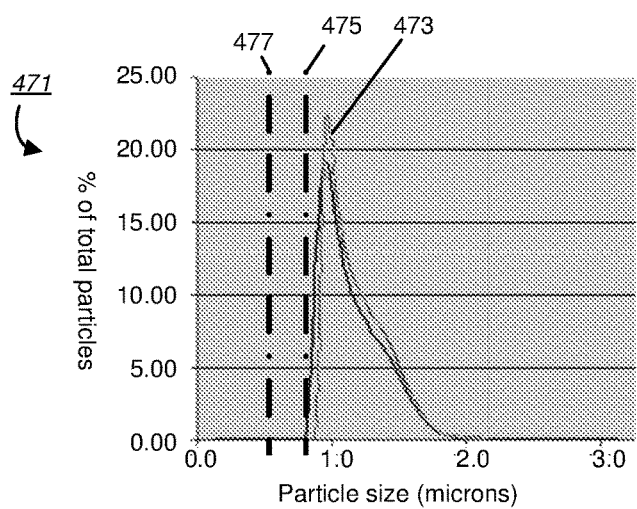
FIG. 4B is a graph showing empirical data as to particulate size in a stannous material treatment system, applied to the treatment of potable water.

FIG. 4B shows data 441 pertinent to filter configuration and the use of two or more filters in cascaded form in an exemplary potable water distribution system. More particularly, FIG. 4B shows empirical data as to distribution of particulate size in such a fluidics system. As indicated in the FIG., virtually all particulate size is found to be larger than one micron—plot lines 443 show that virtually all filtered particles (99%+) fall to the right of a demarcation line 445 at 0.80 microns, with the plurality of particulate being just over 1.0 microns in size. A second demarcation line 447 Is observed at approximately 0.5 microns. A designer attempting to minimize impediments to fluid flow can implement multiple cascaded filters and/or filter types so as to minimize cleaning processes and/or otherwise optimize system efficiency. For example, a first filter can be designed (as indicated above) to be sufficiently coarse so as to filter most particulate, including metal particulate and tin dioxide, and to be taken offline for cleaning without interfering with operation of the rest of the system; a second tier filter encountering a very small amount of particulate, for example, to filter soluble stannous material and need be cleaned or replaced much less frequently, and can serve as a primary filter during periods when the primary filtration system is offline (e.g., for cleaning). A competent designer can identify one or more lines of demarcation based on any desired statistical parameter(s) and base filtration system design particulars on application and associated goals. For example, relative to the system depicted in FIG. 4A, a designer can employ a primary filter having a first filtration capability and one or more secondary filters having other filtration capabilities to achieve a suitable trade off in terms of maximizing system downtime and cleaning/replacement requirements, while at the same time, avoiding impediments to flow. A skilled designer can select suitable filtration system design particulars so as to achieve desired objectives, which may vary depending on application and local conditions (e.g., network age, presence of existing corrosion in the system, large scale distribution, commercial, small building, home, typically alkaline water supply, etc.).

FIGS. 5A-5D show a number of electrode configurations that can be used for an electrolysis system, i.e., to dose stannous material at variable, controllable rates into a fluid of interest. These designs should be viewed as non-limiting, e.g., other variations will readily occur to those having skill in the art but are nevertheless contemplated by this disclosure.

Figure 5A:
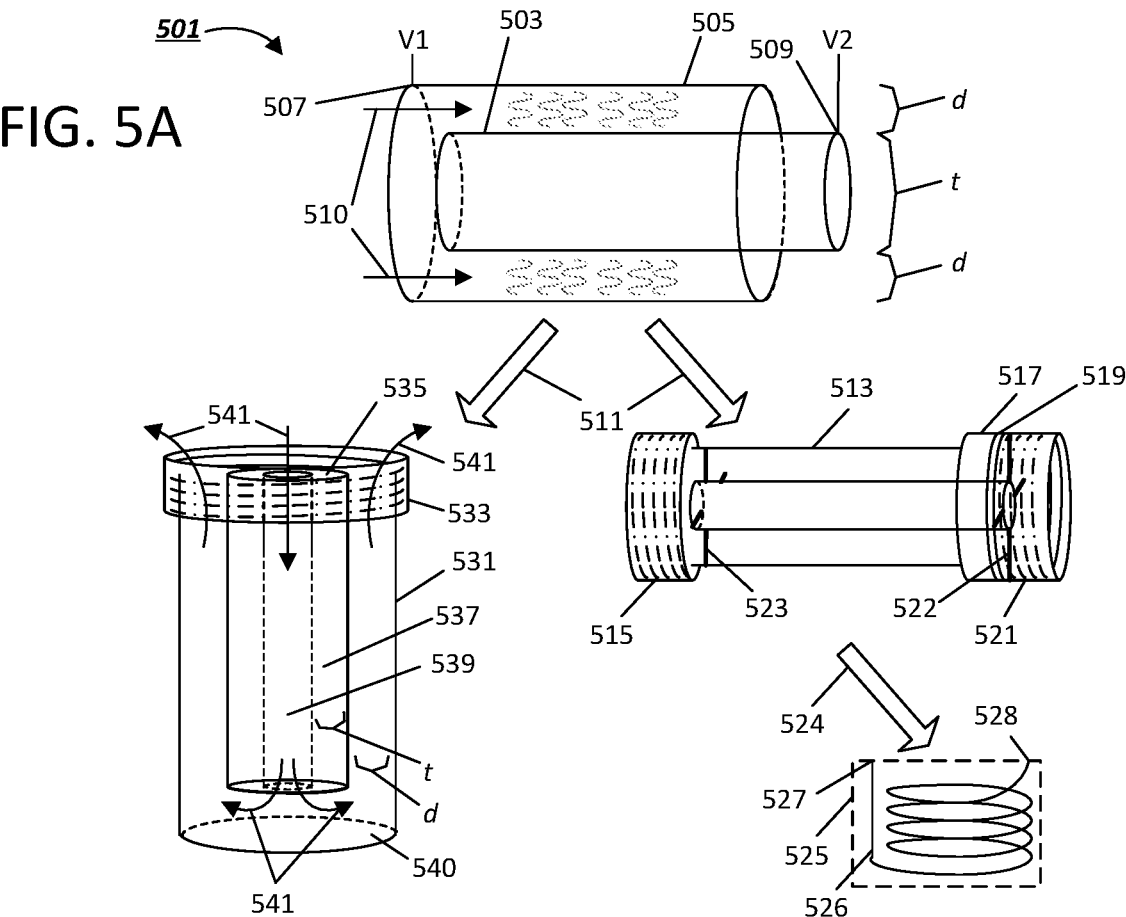
FIG. 5A shows one embodiment of an electrolysis system that features a degrading electrode (in this case, made of food grade tin) that dissolves to transfer soluble stannous material to a fluid of interest. The configuration represented by FIG. 5A is based on one or more electrodes arranged as concentric pipes.

FIG. 5A illustrates an embodiment 501 where an anode and cathode are configured as concentric devices, 503 and 505 respectively. That is, an outer tube (a stainless steel cathode in this case) is connected to a first terminal 507 (carrying potential V1) while a second, solid wire having thickness (e.g., diameter) t, positioned inside the tube, is connected to a second terminal 509 (carrying potential V2). Note that these concentric elements 503 and 505 are advantageously configured so that a substantially constant distance (d) exists between the anode and cathode, e.g., the depicted electrodes are said to be synchronized or matched and generate a substantially uniform and constant electric field along their substantially-common length. As represented by arrows 510, fluid to be treated travels in between these tubes with the electric field (EF) passing in a direction normal to its flow direction. The EF causes solid metal tin from the electrode to dissolve into the water as stannous reagent. In a small-scale (e.g. residential) application, t will typically be on the order of one centimeter or less, whereas for a large-scale application, t may be on the order of 0.2-2 inches, or more. Similarly, in a small-scale (e.g. residential) application, d will be on the order of about less than one centimeter, so as to provide for a reasonable rate of flow, whereas for a large-scale application, d may be on the order of an inch or more.

Arrows 511 are used to show two associated concentric electrode implementations. First, as seen at the right-side of the figure, the arrangement can be configured as a pipe assembly which is adapted for modular connection using respective sets of pipe threads 513 and 521; in this example, the pipe threading not only provides for a water-tight seal, but it also provides for electrical contact so as to provide electrical connection to the anode and cathode. For example, the anode can be concentrically-mounted within outer pipe 513, in a manner centrally-supported by a bridging conductor 522 and a bridging insulator 523. The conductor electrically couples the anode to threading 521 while isolating the anode from threading 515, all while permitting water to flow within outer pipe 513. At the same time, threading 515 electrically couples to the outer pipe 513, which serves as the cathode, while an insulator ring 519 electrically isolates a terminus 517 of the cathode from threading 521. This example shows a case where modular engagement of a replacement unit (e.g., the depicted pipe) facilitates both electrical and water-tight connections, e.g., facilitating modular replacement in (e.g.) a small scale application such as a building-scale application. Numerals 525, 526, 527 and 528 show an alternative electrode configuration, e.g., where either electrode can be configured as a coil 526 within a housing 525; that is, as the modular unit comprising the housing 525 and coil 526 is replaced (e.g., screwed-in/unscrewed), the connection process establishes electrical connection and aligns electrodes so as to optimally positioned relative to fluid flow. As to the second concentric electrode implementation, depicted at the left-hand side of the figure, the electrodes can be configured for single-ended (e.g., cylindrical) attachment with electrical connection and fluid connection provided at one end only. That is, as depicted, water flows in and out as represented by arrows 541; in the depicted example, the anode 537 is a somewhat thick but hollow tube, e.g., water travels through its central bore 539 toward the base of the assembly 540, where it is recirculated upward, in between the outer circumference of the anode and the exterior tube 531 (i.e., the cathode). Once again, a threaded coupling 533 can be used to electrically attach and detach the electrodes as a module, with an inner seal and electrical contact 535 being used to effectuate a water-tight connection. The depicted configuration is seen to have a consistent anode thickness t and a consistent distance d between the anode and cathode, such that the electrodes are once again optionally synchronized or matched. This second example once again shows a modular unit that is well-suited to small-scale (e.g., building or single-family dwelling applications).

Figure 5B:
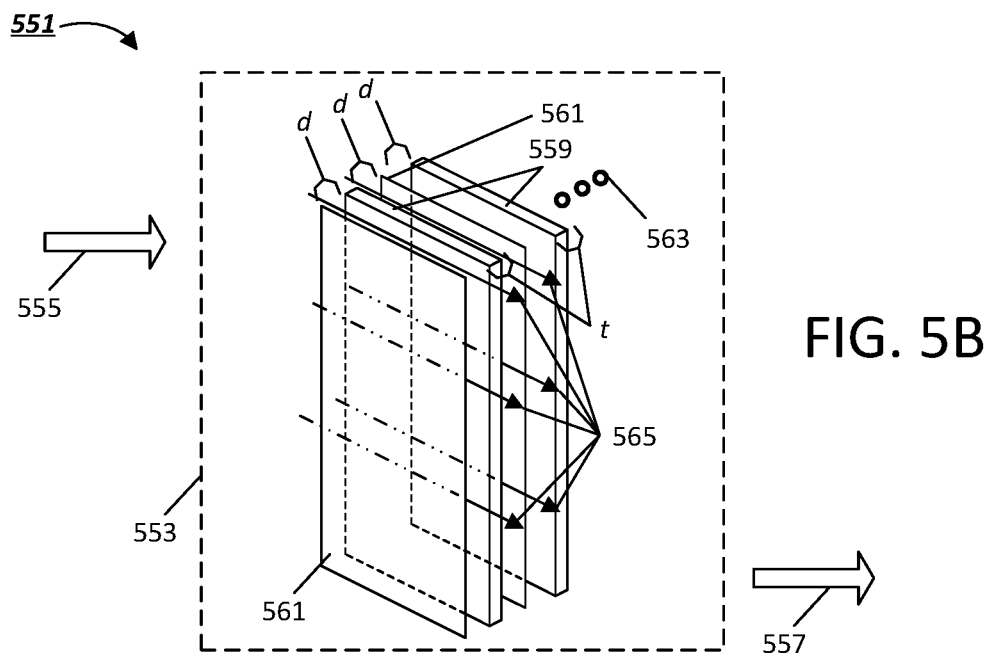
FIG. 5B shows another embodiment of an electrolysis system that features a degrading electrode; in the case of FIG. 5B, the configuration is based on parallel plates, for example, made of food grade tin that similarly is dissolved over time and transferred to a fluid of interest using electrolysis.

FIG. 5B shows an embodiment 551 that relies on parallel plates to serve as anode and cathode. More specifically, the figure shows a housing 553, a water ingress path 555 and a water egress path 557. The housing mounts the various plates, with water flowing between the plates as represented by arrows 565. The anodes are represented as relatively thick plates 559 made of tin and having thickness t, while the cathodes are represented as relatively thin plates 561, each separated from one or two anodes once again by distance d. As this example demonstrates, the anode-cathode relationship can be optionally configured as an "anode sandwich" (i.e., one anode sandwiched between two cathode plates, thereby presenting two water flow paths), a "cathode sandwich" (e.g., one cathode sandwiched between two anode plates, thereby presenting two water flow paths), or as many plates of alternating anodes and cathodes. For a commercial application, the anodes can be made relatively thick (e.g., an inch or more, with an inch or two (or more) separation between plates, such that the anode wears out uniformly and symmetrically over time, producing a consistent electric field; once again, in this example, the anode and cathode can be made to be synchronized or matched. To refurbish a system of this type, in a large scale application, the housing can be configured to slidably-receive the anode plates as panels with a spring-loaded and/or frame-guided mechanism, e.g., to place each anode panel exactly between opposing cathode plates and to provide for suitable electrical connection; the system is taken offline as the anode plates wear thin, and new, thick plates of metal tin are used to replace thinner, worn plates. Alternatively, both anode and cathode plates can be made of equally-sized tin plates; an alternating current is then applied to such a system is periodically alternated with frequency ranging from 5 seconds to 10 min. In this configuration both electrodes dissolve uniformly and metal load per generator volume is higher. In an AC system (i.e., where every plate serves double duty as both anode and cathode), each of the plates can be individually configured for modular, panel-specific, spring-loaded replacement in this manner.

Figure 5C:
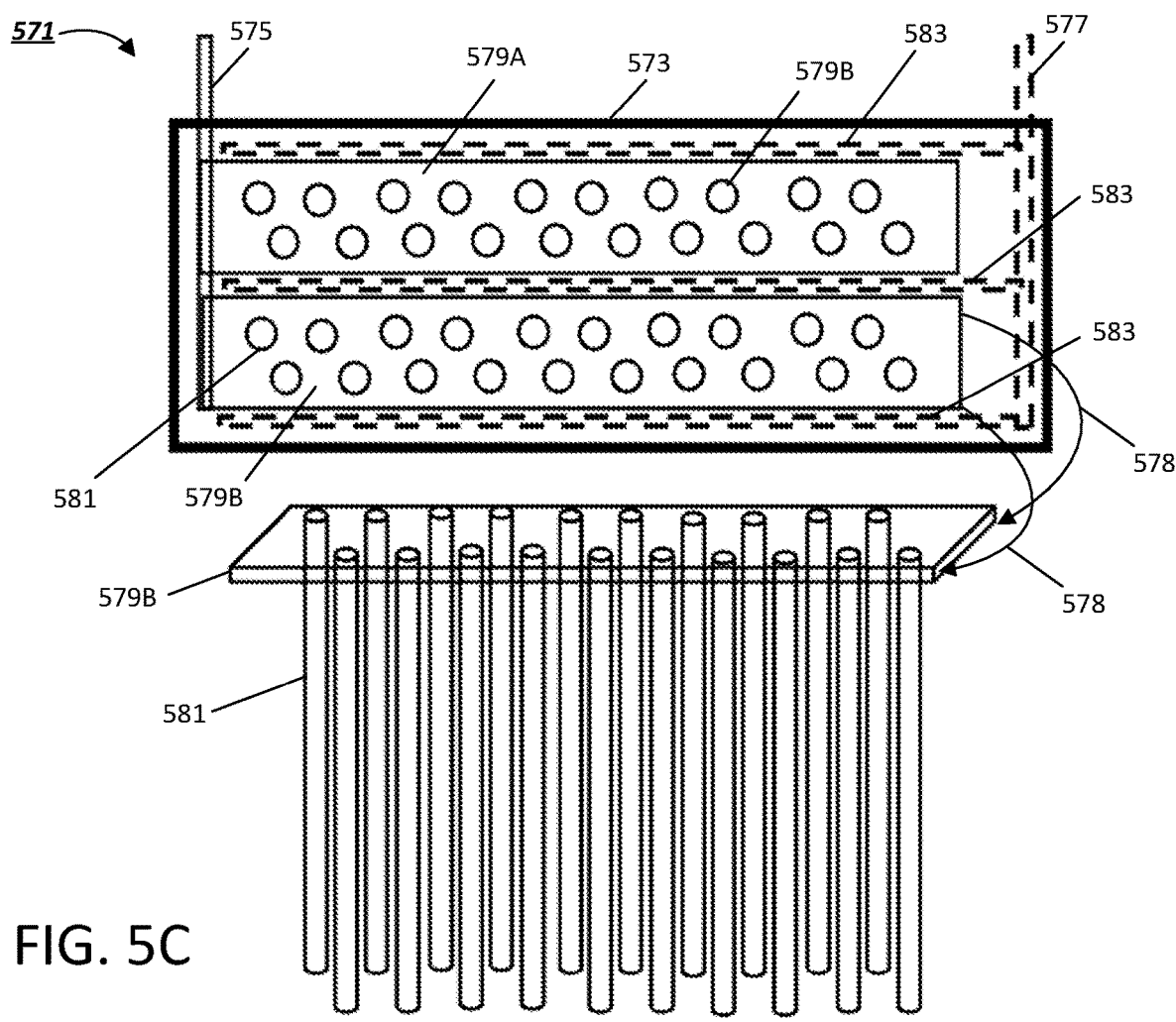
FIG. 5C shows another embodiment of an electrolysis system that features a degrading metal tin electrode; in the case of FIG. 5C, the configuration is based on rods, for example, made of food grade tin that similarly is dissolved over time and transferred to a fluid of interest using electrolysis.

FIG. 5C shows still another embodiment 571, this time predicated on the use of relatively thick tin rods (581) as anodes. More particularly, the top portion of the figure shows a top-plan view of the assembly, including a housing 573 and electrical terminals 575 and 577 for the anodes and the cathode, respectively. Terminal 575 electrically couples to two horizontally-disposed conductive mounting plates 579A and 579B, which each mount a multitude of solid metal tin rods (e.g., 581), while terminal 577 electrically couples to vertically-disposed cathode plates 583. Arrows 578 represent an action where part of the assembly 571 is turned over to provide a perspective view of one of the mounting plates 579A, and associated tin rods, as seen at the bottom portion of the figure. The cathode plates 583 (not seen at the bottom of the figure) are positioned parallel to the drawing page on either side of the tin rods (e.g., 581). Water flows in this configuration in between the rods, from left-to-right relative to the drawing page, with the generated EF extending between the tin rods and the closest of the adjacent vertical cathode plates 583. In a typical implementation, the rods 581 are an inch or more in thickness and are designed to support high-flow rates consistent with large scale applications. The anode(s) are replaced by removing and replacing the mounting plate/rod assembly seen at the bottom of the figure, or individual rods.

Figure 5D:
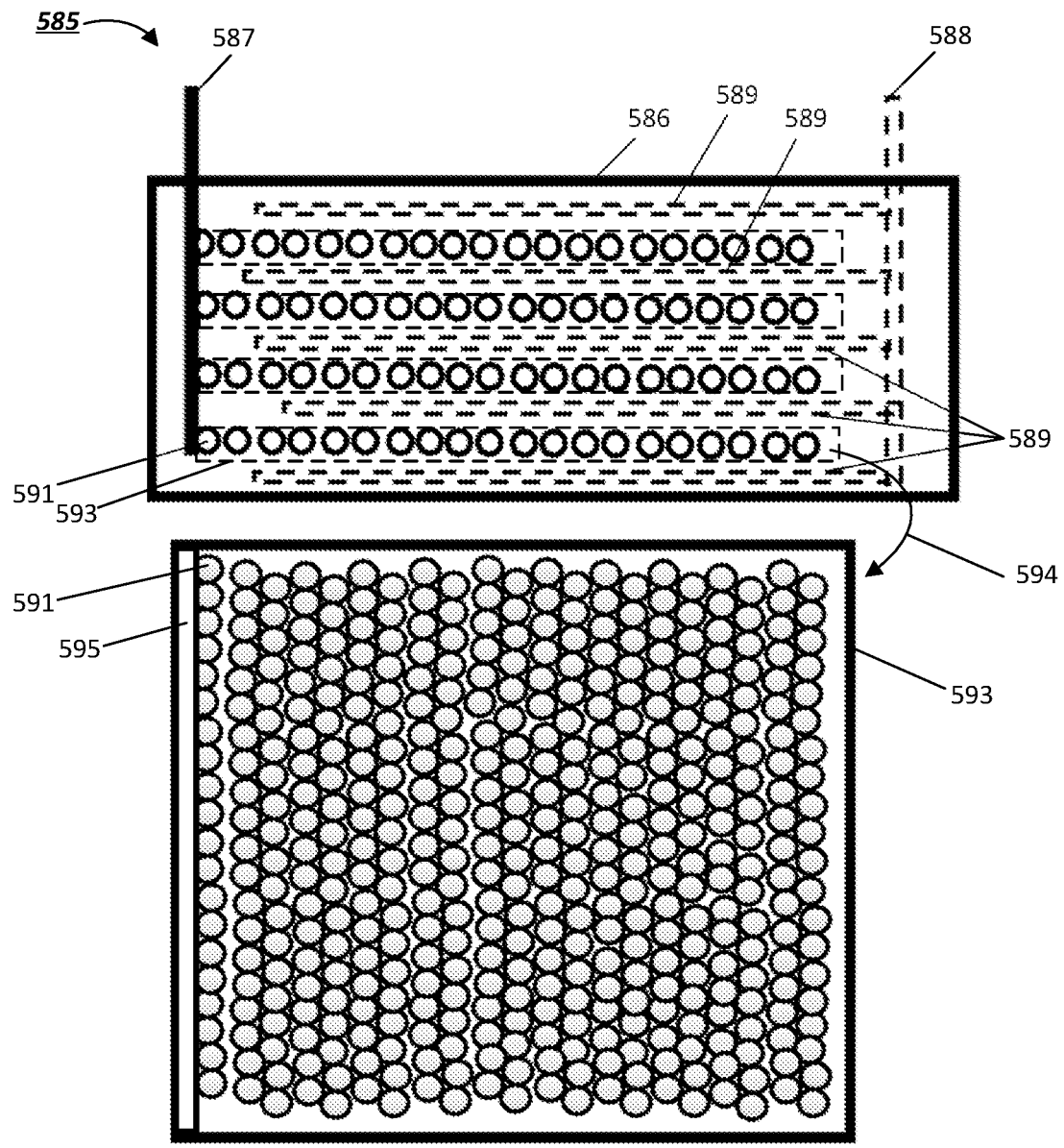
FIG. 5D shows another embodiment of an electrolysis system that features a degrading electrode; in the case of FIG. 5D, the configuration is based on rods, for example, made of food grade tin that similarly is dissolved over time and transferred to a fluid of interest using electrolysis.

FIG. 5D shows an embodiment 585 similar to the one seen in FIG. 5C, except that it is based on the use of tin metal spheres (e.g., 591). The figure once again shows a plan view at the top of the drawing page and a side view at the bottom of the drawing page. Referring to the plan view at the top of the page, the embodiment once again has a housing 586 and first and second conductive terminals 587 and 586 to provide current to the anode and cathode components, respectively. In the depicted example, the anode is configured as a series of mesh cages 586 (i.e., conductive or non-conductive) which serve as vertical plates, each carrying a multitude of metal tin spheres (as seen at the bottom portion of the figure, where one of these vertical plates is removed and seen laid against the drawing page, as denoted by arrow 594). The mesh cage permits water to pass, and each metal sphere can have a size on the order of a centimeter to 1-2 inches in diameter. The spheres for each vertical panel are "packed-in" to the associated mesh cage, i.e., such they establish electrical contact with each other as well as with a vertically oriented conductor bar 595, which couples to terminal 587. The mesh cage for each anode "panel" permits water to flow into and out of the cage, with the tin metal spheres used to maximize surface area and thus the efficiency with which tin is transferred into the water during electrolysis. Once again, the cathode(s) can be configured as a series of vertical metal (e.g., stainless steel) plates 589 which lie in between the vertical anode panels, much as was depicted above in connection with FIG. 5B. Once again, the depicted implementation is suitable for large-flow applications and the anode panels are replaced by taking the system offline and individually removing each of the mesh cages (i.e., each as a modular panel) with a new panel.

Specific embodiments will be presented below which (a) use one or more test apparatuses to "learn" weights and/or data that can be used to predict scale degradation and/or trends that may lead to corrosion (FIG. 6A) and (b) permit dynamic reaction to conditions, e.g., to detected metal presence in the liquid of interest (depicted in FIG. 6). Once again, all possible permutations and combinations of the various components of these systems, without any elements being "required," are also specifically contemplated.

Figure 6A:
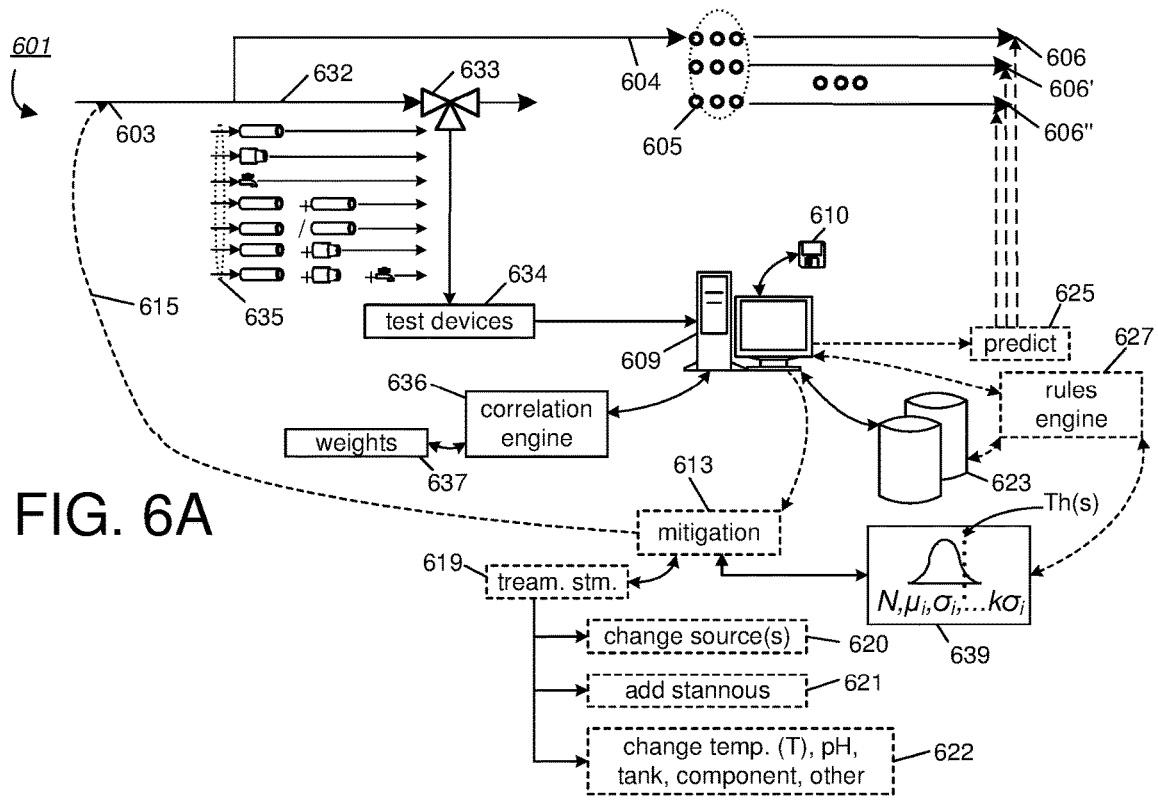
FIG. 6A shows an embodiment of a testing system for use in a recirculatory or distribution fluidic network. The testing system of FIG. 6A can be used to correlate fluid chemistries and other fluidic system environmental variables with corrosion/pipe degradation.

FIG. 6A shows a system implementation 601 that can be used to measure corrosion and/or tin dioxide impact on one or more test specimens 635, and to control a fluidic network based on observed data. Water or another fluid arrives as influent 603. This path is optionally branched through piping (represented by ellipses 605) into many flow paths or delivery points, for example, 606, 606', 606", etc. In the depicted system, fluid can be sampled at an "upstream" or central location, for example, at siphon valve 633, and fed to one or more test specimens 635. Tests are conducted based on both native fluid parameters as well as on fluid that has passed through test specimens 635, and are used to predict and/or mitigate what will happen at downstream points in the network, for example, at delivery points 606, 606', 606", etc. As an illustrative example, the depicted system 601 might be applied to a city's potable water distribution system, with branch path 632 representing a central water distribution center, and delivery points 606, 606', 606", etc., representing various customer delivery points within the city. The configuration as depicted provides for comparative measurement at the central point of (a) raw water parameters (e.g., pH, temperature, flow rate, sanitizer presence, metal species concentration, and so forth), at an upstream location, and (b) effects of passing raw water through one or more of the test specimens 635. In turn, comparative measurement in this manner enables development of database information that permits reactive control, so as to influence what happens at delivery points 606, 606' and 606". Naturally, this configuration is exemplary only. One or more test devices (e.g., optionally including an electroanalytical measurement device, one or more metal detectors, a pH sensor, a thermometer, one or more flow rate sensors, and sensors for other environmental parameters, as introduced earlier), 634, can be installed in connection with such a network to perform local, in situ measurements on samples of a fluid at-issue, with data being correlated to "learn" conditions that can be used to predict scale degradation, $SnO_2$ build up and/or degradation, and/or impact on corrosion.

Data from testing is provided to the hardware/instructional logic (609/610) and used to build a database 623 representing learned information. The hardware/instructional logic 609/610 optionally implements a correlation engine 636 (e.g., a software tool based on regression, convolution and/or related techniques), which generates and updates weights 637 which can then, later on, be applied to proactively control mitigation efforts, including without limitation, detection of at risk piping, application of mitigation measures, stannous material dosing control, and so forth. This is to say, a rules engine 627 can be used to apply tests based on developed weights in order to detect "events" that are pertinent to system control. The depicted system can optionally be used, under the auspices of one or more computers, to take mitigation actions 613 involving one or more treatment systems 619 dependent on detected conditions. For example, if degeneration of $SnO_2$ surfactant film thickness or coverage is detected, the system can beef up stannous ion dosing, or perform an ad hoc maintenance cycle as conceptually represented by a feedback path 615 and numeral 621. Such a condition can be detected upon comparison with learned data, including any statistical measures or probability estimates as appropriate, as represented by numeral 639, and comparison with one or more thresholds "Th(s)." In addition to regulating stannous ion dosing, other actions that can potentially be taken including the control over fluid source selection 620 selection and/or environmental particulars 622; for example, the use of sanitization agents can be switched, concentrations changed, sources can be switched, or actions can be taken to lower (or raise) pH. Many other suitable control options and reactions will naturally occur to those having ordinary skill in connection with the particular application at issue. The measured data, and accumulated knowledge form the database 623 (and the associated rules engine 627) can then be used in prediction of fluid conditions at the current time, at a particular location in the network of interest, in response to expected conditions at a future point in time, or in response to any combination of these things. For example, predictions based on current conditions and respective pipe conditions can optionally be specified at a future point in time for different downstream points in the fluidic network, including without limitation at locations 606, 606', 606" and so forth.

Figure 6B:
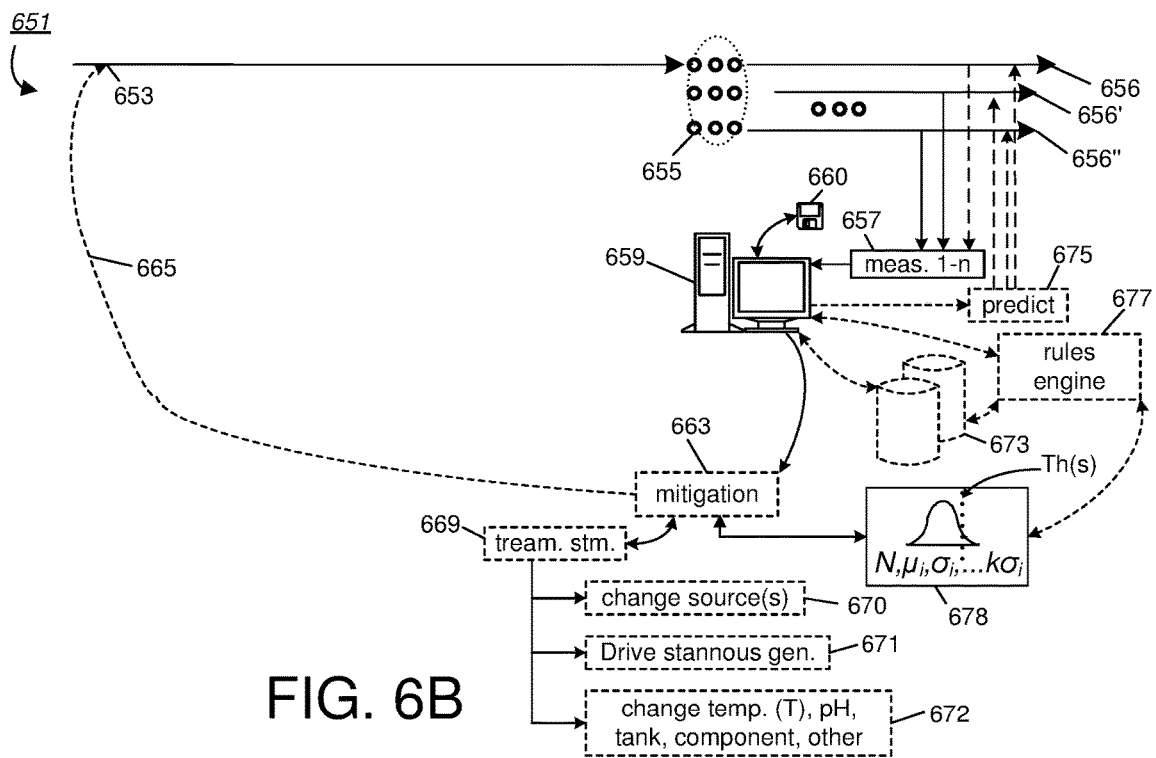
FIG. 6B shows an embodiment for treating a fluidics system with stannous material so as to resist corrosion.

Note that that use of test specimens is not required for all embodiments, and conversely, stannous reagent generation can be driven in response to feedback provided by downstream measurement, e.g., at downstream flow points. FIG. 6B shows a system configuration similar to that seen in FIG. 6A, but which does not feature the use of test specimens, but instead features reaction (i.e., mitigation action 663) responsive to conditions detected at one or more measurement points 657 within the network 651.

As before, a fluid arrives as an influent at location 653 and is carried by a distribution or recirculation network, which features one or more pipes, joints, fixtures, conduits or other elements made at least in part of a metal material (these are conceptually represented by ellipses 655). The metal material, under certain circumstances, has a potential to corrode, thereby transferring metal to the liquid. The metal can be transferred in various forms or compounds (i.e., different species of one or more particular metals at issue). Presence of the metal can be detected at one or more downstream points, represented at locations 656, 656' and 656". Measurement at these points can be used to identify suspect piping sections, and thus, provide an indication as to where corrosion is occurring in the network. The metal of interest should be assumed to be one of lead, iron or copper but, depending on application, it can be any metal material including without limitation aluminum, zinc, nickel, chromium, selenium, or another metal.

As represented by numerals 659 and 660, the measurements can once again be provided to circuitry and/or instructional logic embodied as one or more processors being managed under the control of suitable software (i.e., represented as a symbolic computer and floppy disk icon). This hardware or software logic (659/660) optionally detects the occurrence of corrosion or, in other embodiments, a trend representing loss of a deliberately-maintained scale and/or $SnO_2$ layer, or a trend otherwise correlated with corrosion, and effectuates mitigation actions (i.e., per numeral 663). These mitigation actions can, once again, include control processes as represented by path 665, including stannous dosing or adjustment of environmental parameters. For example, as represented by numerals 669, 670, 671 and 672, these actions can include optional control over one or more treatment systems, which trigger a change of liquid source, the addition of stannous material or other actions. The depicted system can also be used to predict future trends (675) based on time-based correlations. For these embodiments, the hardware/instructional logic (659/660) can rely on a database 673 and/or a rules engine 677, which is scripted to take certain actions in response to certain conditions. For example, it might be for a particular system that $SnO_2$ degradation and/or ensuing corrosion are expected to occur as a function of a prolonged period of oxidizing water conditions and/or acid, neutral or base pH.

As noted earlier, the incorporated by reference document provide substantial additional detail and considerations related to the operation of a tin dioxide system and related techniques which are pertinent to the principles disclosed by this system. For example, USPB 20200207645 provides substantial detail on reactions involving, and sequestration of, specific forms of selenium and mercury, see, e.g., the later figures of this publication; it is within the ordinary level of skill to develop similar phase and reaction information for metals pertinent to those discussed herein, including without limitation, lead, iron and copper, and their interrelationship with existence of, and thickness of, a $SnO_2$ surfactant layer. Various combinations between these incorporated by reference documents (i.e., our prior work) and the techniques discussed herein will readily occur to those having skill in the art, and all permutations of such combinations, and the mixing and matching of their features, as pertinent to a specific application are contemplated herein. Accordingly, the principles discussed herein are intended to be illustrative examples, rather than being exhaustive.

FIGS. 7A-7D are used to provide some considerations pertinent to stannous material dosing.

Figure 7A:
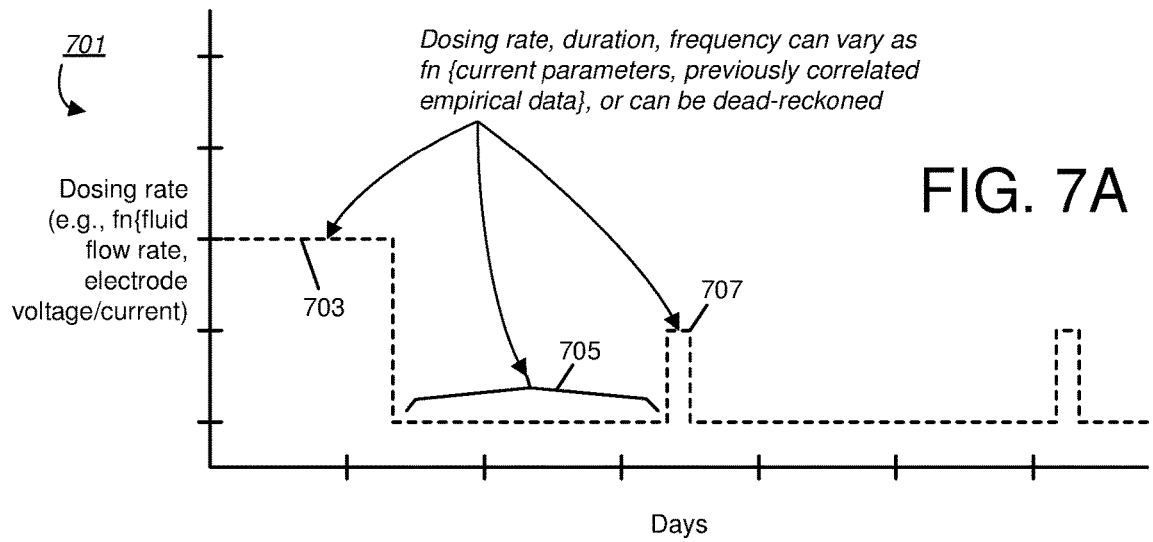
FIG. 7A shows a first dosing protocol for a fluidic network.

More particularly, FIG. 7A illustrates a relationship 701 between stannous dosing and formation of a tin dioxide surfactant layer on piping surfaces. In one example, a piping section of interest is exposed to dosing having a predetermined concentration for a predetermined period 703, for example, 2.0 PPM in a water supply maintained for 30 hours, as an example. The concentration of stannous material in this example is a function of flow rate and electrical stimulus applied to one or more tin electrodes. Empirical observations indicate that, for water, soluble stannous material spreads readily, providing to delivery of tin to substantially all fluid interfaces within a wide area (e.g., hundreds of meters). The stannous material causes buildup of tin dioxide on piping surfaces at a much slower rate, and it is for this reason that dosing is maintained for a period of hours. Empirical data suggests that for water, this dosing and time of exposure are sufficient to enable formation of a uniform 1.0 micron thick layer of tin dioxide, and further, that such a surfactant thickness is sufficient to reduce corrosion by upwards of 75% of what would occur absent the surfactant level, with greater benefits in corrosion reduction achieved by higher dosing and/or longer exposure times, and consequently, thicker surfactant layers. Empirical data further suggests that the tin dioxide surfactant layer, while relatively soft, is long lived in the absence of abrasive conditions. Consequently, it is believed that it is not necessary to maintain continuous stannous reagent delivery, and that in a typical water distribution system, occasional redosing might be performed simply as a prophylactic measure, or as otherwise needed in response to detected conditions. For example, FIG. 7A suggests that redosing 707 may not be needed for days or weeks, and that dosing concentrations and durations, and duration between redosing 705, can all differ from (and be less than) dosing 703 which was initially used to develop a base layer thickness. As therefore represented by the FIG., a typical application cycle consists of an initial period with dosing and exposure duration calculated to develop a target layer thickness (e.g., 1.0-10.0 micron average thickness), and with occasional maintenance cycles with lower dosing and lower exposure time.

Figure 7B:
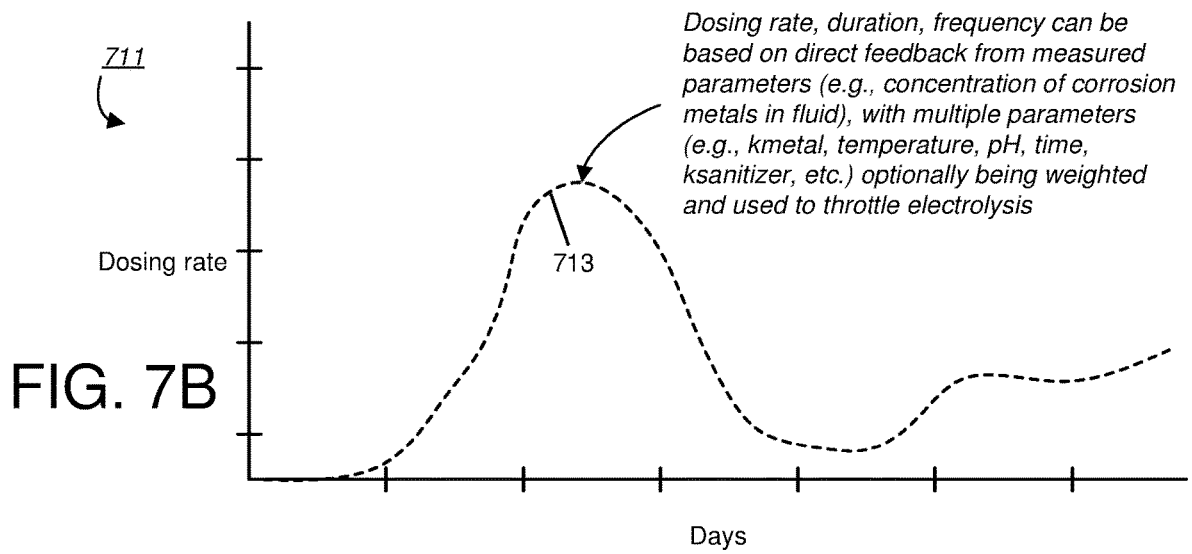
FIG. 7B shows a second dosing protocol for a fluidic network.

FIG. 7B illustrates an alternative dosing methodology 711, namely, where dosing is continually varied over time in response to detected system conditions. As an example, dosing rate 713 can be continually throttled in proportion to detection of corroded metal species in fluid of interest—as corrosion is detected (e.g., lead, copper or iron is detected in trace amounts), stannous dosing is increased continually or in stages until a downward trend in metal species is detected; when and as metal concentration reaches minimally accepted levels, the dosing is proportionally reduced.

Figure 7C:
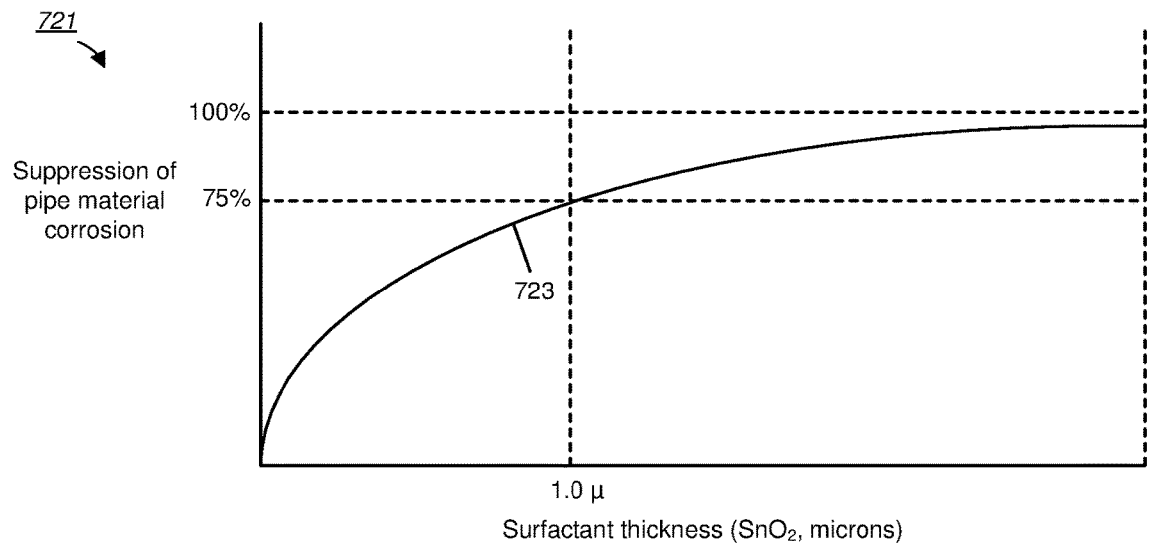
FIG. 7C is a graph showing corrosion of a pipe section as a function of tin dioxide surfactant build up.

FIG. 7C shows a curve 721 that interrelates exposure time to stannous material with detected corrosion. More particularly, in a water distribution system, corrosion begins immediately where there is no passivation (e.g., assuming in this example a pH of 8.6, free chlorine of 1.0 PPM and an experimental flow rate of 1.0 liters/minute). Stannous material is then added to a provide a dosing concentration of 2.0 PPM and corrosive species production begins to slow as tin dioxide forms on interior pipe surfaces. Given these parameters, it was found that a 1.0 micron thick tin dioxide layer was formed after about 30 hours of exposure, and this surfactant thickness results in suppression of corrosion rate by approximately 75-80%. [The thickness was measured based on difference in weight of the treated pipe versus the pre-passivated specimen.] The depicted data suggests that for corrosion suppression of at least 75% that a 1.0-10.0 micron thick layer of surfactant is desired. Note that it is within the level of one of ordinary skill in the art to develop similar data, given variation in fluid, application, piping materials, and so forth, using similar approaches.

Figure 7D:
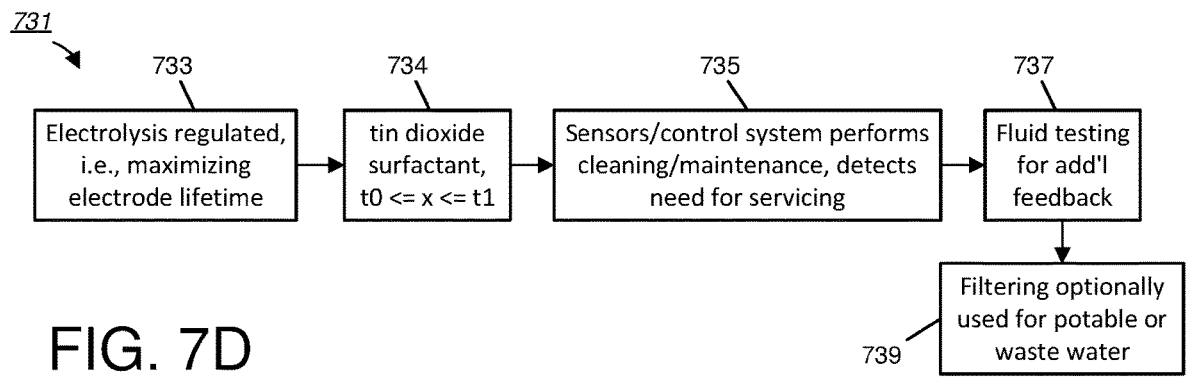
FIG. 7D is a block diagram used to convey some final observations.

FIG. 7D is used to present some final considerations, generally represented by numeral 731. First, electrolysis can be used on a regulated basis, with dosing rates carefully controlled to provide exactly a desired dosing of stannous material to a fluidics system, per numeral 733. The dosing is controlled so as to not waste electrode material, and to develop a target thickness of a tin dioxide layer (i.e., with a thickness "x" between first and second thresholds, t0 and t1, as indicated by numeral 734). Sensors and/or a control system 735 can be used to maintain electrode performance, by measuring reagent generation efficiency, and by initiating cleaning and replacement cycles as needed, with electrolysis control once again being throttled to provide dosing tailored to exactly the desired surfactant thickness (or a range of desired surfactant thicknesses). Per numeral 737, a fluid of interest can also be tested, for example, to measure environmental parameters that will provide feedback needed for appropriate dosing and/or maintenance of a optimal surfactant thickness for one or more pipe sections of interest. Finally, per numeral 739, in some systems, particularly those involving potable water, filtering can be performed, as described earlier, to provide safe drinking water.

It should be appreciated that by providing mechanisms for suppressing corrosion in at risk systems or for at risk piping sections, the techniques provided by this disclosure permit a fluidics system operator to treat at risk systems that may be difficult to access, or that are impractically taken offline for any length of time. As nonlimiting examples, a water supply company can use techniques disclosed herein to treat difficult to reach piping on a localized or wide area basis, and yet continue to supply water on a relatively safe basis notwithstanding presence of corrosive materials. A commercial concern can continue to use an at risk system in its operations while at the same time treating that system so as to protect piping, minimize corrosion, and enhance piping lifetime. It should therefore be understood that the disclosed techniques address the needs referenced at the beginning of this disclosure, and that various modifications based on these techniques can be applied to a wide range of fluidics systems.

While description of embodiments described above has tended to focus on potable and non-potable water and coolant as being a primary applications, it is contemplated that the systems, networks and techniques described above can be applied to other types of fluids, whether liquid, gas, whether water or otherwise. Indeed, it is specifically contemplated that the described techniques can be applied to any type of fluid where effects of corrosion may be present. The described techniques can be embodied at many different tiers of manufacture/implementation, including without limitation: (a) design and/or sale of software for performing/controlling tasks discussed herein, e.g., as instructions stored on nontransitory media; (b) an apparatus, system or device configured to measure corrosion and/or degradation of one or more test specimens, optionally supplied separately; (c) installation and/or use of a network or related techniques which react to detected degradation/corrosion or otherwise help monitor, treat and/or maintain pipes or pipe conditions, or which use feedback to develop and/or refine a predictive model; and/or (d) results of using any of the foregoing.

It should be appreciated that by providing techniques which address measuring network degradation and/or corrosion, the present disclosure significantly enhances ability to control/manage substances which can present a danger to human health or cause further degradation to a network used to distribute and/or recirculate fluids. These techniques provide tools that can be used by system operators, including without limitations, water suppliers and others to better understand how their choices and seasonal effects cause variation in harmful substances, including toxic metals and carcinogens, given service lines and materials in use, and to take proactive measures that will ensure proper scale health, avoid corrosion and/or mitigate the presence of these materials.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. A method comprising:
with a sensor, measuring a value of an environmental parameter associated with a fluidic system;
with an electrolysis system, transferring stannous material from a tin electrode to a fluid being conveyed by the fluidic system, the stannous material to be distributed by the fluid being conveyed to one or more fluidic transport surfaces within the fluidic system, the stannous material to form a surfactant layer of tin dioxide on the one or more fluidic transport surfaces; and with an electronic control system, regulating a supply of electrical stimulus to the tin electrode to thereby perform the transferring in an adjustable manner, wherein the adjustable manner is determined according to the measured value of the environmental parameter, and wherein the regulation of the supply of electrical stimulus is performed so as to form a target thickness of the surfactant layer of tin dioxide on the one or more fluidic transport surfaces;
wherein regulating the supply of the electrical stimulus is performed so as to form the surfactant layer to have a thickness of between one micron and ten microns on at least a predetermined one of the fluidic transport surfaces.

2. The method of claim 1 wherein:
the fluidic system comprises a metal surface that is used to transport the fluid within the fluidic system; and
the environmental parameter comprises a concentration of the metal in the fluid.

3. The method of claim 2 wherein the metal comprises at least one of lead, copper or iron.

4. The method of claim 3 wherein measuring the value comprises using a voltametric device to measure the concentration at a level of resolution that is less than ten parts per billion.

5. The method of claim 1 wherein:
the environmental parameter comprises a least one of a pH, a flow rate, and a temperature; and
regulating the supply of the electrical stimulus comprises controlling at least one of a duration of transfer of the stannous material from the tin electrode to the fluid, or a rate of transfer of the stannous material to the fluid, that is selected dependent on the at least one of the pH, the flow rate, or the temperature.

6. The method of claim 1 wherein the environmental parameter comprises concentration of a by-product of corrosion within the fluidic system, and wherein regulating the supply of the electrical stimulus comprises controlling electrolysis of the tin electrode so as to drive the concentration to a predetermined value.

7. The method of claim 1 wherein the electrolysis is susceptible to variation in reagent generation efficiency, and wherein the method further comprises monitoring the variation and initiating automatically an electrode cleaning cycle when the reagent generation efficiency meets a predetermined threshold.

8. The method of claim 1 wherein the electrode degrades over time and wherein the method further comprises automatically measuring at least one parameter associated with performance of the tin electrode, using the electronic control system to automatically detect an electrode wear-out event, and, responsive to detection of the electrode wear-out event, and with the electronic control system, signaling a human operator of a need to replace the tin electrode.

9. The method of claim 1 wherein the fluid comprises water and wherein the method further comprises filtering tin dioxide particulate from the water with a filter, monitoring performance of the filter, and initiating at least one automated filter cleaning cycle dependent on the monitored performance of the filter.

10. An apparatus comprising:
a sensor operable to measure a value of an environmental parameter associated with a fluidic system;
an electrolysis system operable to transfer stannous material from a tin electrode to a fluid being conveyed by the fluidic system, the stannous material to be distributed by the fluid being conveyed to one or more fluidic transport surfaces within the fluidic system, the stannous material to form a surfactant layer of tin dioxide on the one or more fluidic transport surfaces; and an electronic control system operable to regulate a supply of electrical stimulus to the tin electrode to thereby perform the transference in an adjustable manner, wherein the adjustable manner is determined according to the measured value of the environmental parameter, and wherein the regulation of the supply of electrical stimulus is performed so as to form a target thickness of the surfactant layer of tin dioxide on the one or more fluidic transport surfaces;

wherein the electronic control system is operable to regulate the supply of the electrical stimulus so as to form the surfactant layer to have a thickness of between one micron and ten microns on at least a predetermined one of the fluidic transport surfaces.

11. The apparatus of claim 10 wherein:

the fluidic system comprises a metal surface that is used to transport the fluid within the fluidic system; and the environmental parameter comprises a concentration of the metal in the fluid.

12. The apparatus of claim 11 wherein the metal comprises at least one of lead, copper or iron.

13. The apparatus of claim 10 wherein:

the environmental parameter comprises a least one of a pH, a flow rate, and a temperature; and the electronic control system is operable to regulate the supply of the electrical stimulus by controlling at least one of a duration of transfer of the stannous material from the tin electrode to the fluid, or a rate of transfer of the stannous material to the fluid, that is selected dependent on the at least one of the pH, the flow rate, or the temperature.

14. The apparatus of claim 10 wherein the environmental parameter comprises concentration of a by-product of corrosion within the fluidic system, and wherein the electronic control system is operable to regulate the supply of the electrical stimulus by controlling electrolysis of the tin electrode so as to drive the concentration to a predetermined value.

15. The apparatus of claim 10 wherein the electrolysis is susceptible to variation in reagent generation efficiency, and wherein the apparatus further comprises circuitry operable to monitor the variation and to initiate, automatically, an electrode cleaning cycle when the reagent generation efficiency meets a predetermined threshold.

16. The apparatus of claim 15 wherein the apparatus comprises an ultrasound generator positioned to direct ultrasound energy toward the electrode, and wherein the electrode cleaning cycle is effectuated by control, by the electronic control system, of the ultrasound generator to clean the tin electrode with ultrasound.

17. The apparatus of claim 10 wherein the electrode degrades over time and wherein the apparatus further comprises circuitry operable to automatically measure at least one parameter associated with performance of the tin electrode, and wherein the electronic control system is operable to automatically detect an electrode wear-out event, and, responsive to detection of the electrode wear-out event, and is to automatically signal a human operator of a need to replace the tin electrode.

18. The apparatus of claim 10 wherein the fluid comprises water and wherein the apparatus further comprises a filtration system to filter tin dioxide particulate from the water.

* * * * *